(12) United States Patent
Wada et al.

(10) Patent No.: US 8,180,483 B2
(45) Date of Patent: May 15, 2012

(54) OVERHEAD TRANSFER/STORAGE SYSTEM AND OVERHEAD TRANSFER/STORAGE METHOD

(75) Inventors: Ryoichi Wada, Tokyo (JP); Issei Isaka, Tokyo (JP); Toshihiko Watanabe, Tokyo (JP)

(73) Assignee: Hirata Corporation (JP)

( * ) Notice: Subject to any disclaimer, the term of this patent is extended or adjusted under 35 U.S.C. 154(b) by 650 days.

(21) Appl. No.: 12/227,233

(22) PCT Filed: May 17, 2006

(86) PCT No.: PCT/JP2006/309869
§ 371 (c)(1),
(2), (4) Date: Dec. 5, 2008

(87) PCT Pub. No.: WO2007/132535
PCT Pub. Date: Nov. 22, 2007

(65) Prior Publication Data
US 2009/0321219 A1  Dec. 31, 2009

(30) Foreign Application Priority Data
May 15, 2006  (JP) .................................. 2006-134601

(51) Int. Cl.
*B65G 43/08* (2006.01)
(52) U.S. Cl. ............... 700/214; 198/341.01; 198/346.2; 414/286; 414/281

(58) Field of Classification Search ................... 700/214, 700/218, 219, 223
See application file for complete search history.

(56) References Cited

U.S. PATENT DOCUMENTS

| 3,964,619 | A | * | 6/1976 | Irmler | 414/281 |
| 4,993,906 | A | * | 2/1991 | Nisimura et al. | 414/286 |
| 6,315,513 | B1 | * | 11/2001 | Harukawa et al. | 414/286 |
| 6,362,443 | B1 | | 3/2002 | Kinoshita et al. | 209/574 |
| 7,221,998 | B2 | * | 5/2007 | Brust et al. | 700/245 |
| 2004/0265097 | A1 | * | 12/2004 | Kim et al. | 414/286 |

FOREIGN PATENT DOCUMENTS

| JP | 61-055023 | 3/1986 |
| JP | 2000-238906 | 9/2000 |

* cited by examiner

*Primary Examiner* — Gene Crawford
*Assistant Examiner* — Kyle Logan
(74) *Attorney, Agent, or Firm* — Bacon and Thomas, PLLC

(57) ABSTRACT

In an overhead conveyance/storage system 1 including at least a storage area 100 for the storage of products (e.g., tires) 200, at least one transfer holder 300 adapted to move through a ceiling space in the storage area 100 in three dimensions, including vertical, transverse and longitudinal directions while holding the products 200, and unloader 500 for carrying out the products 200 from the storage area 100, a product receiving position (product unloading position) 501 of the unloader 500 is set to a nearly central part of the storage area 100 when seen in plan. The overhead conveyance/storage system 1 further includes loader 400 for carrying the products 200 into the storage area 100, and product discriminator 402 is disposed in the loader 400.

14 Claims, 26 Drawing Sheets

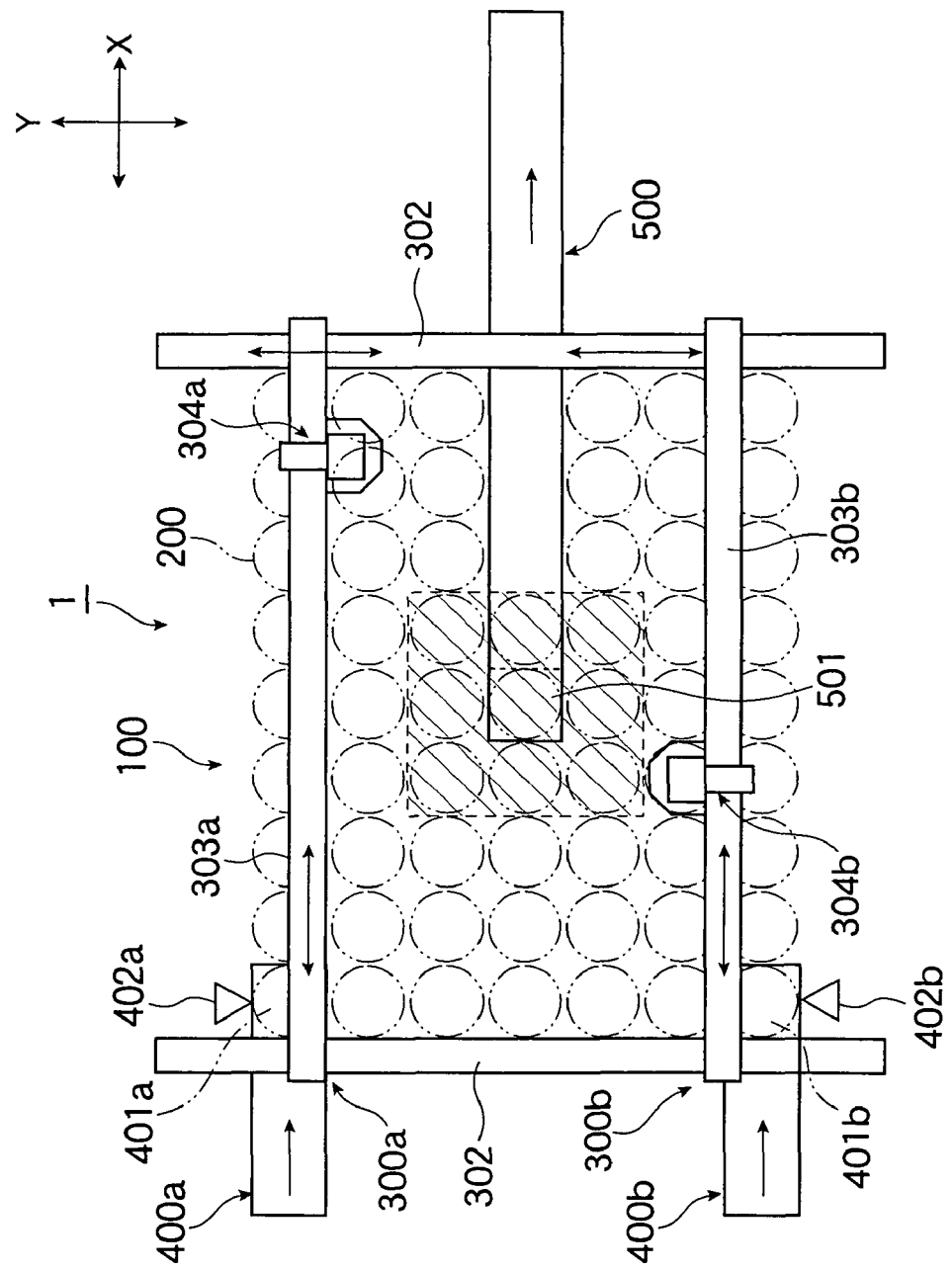

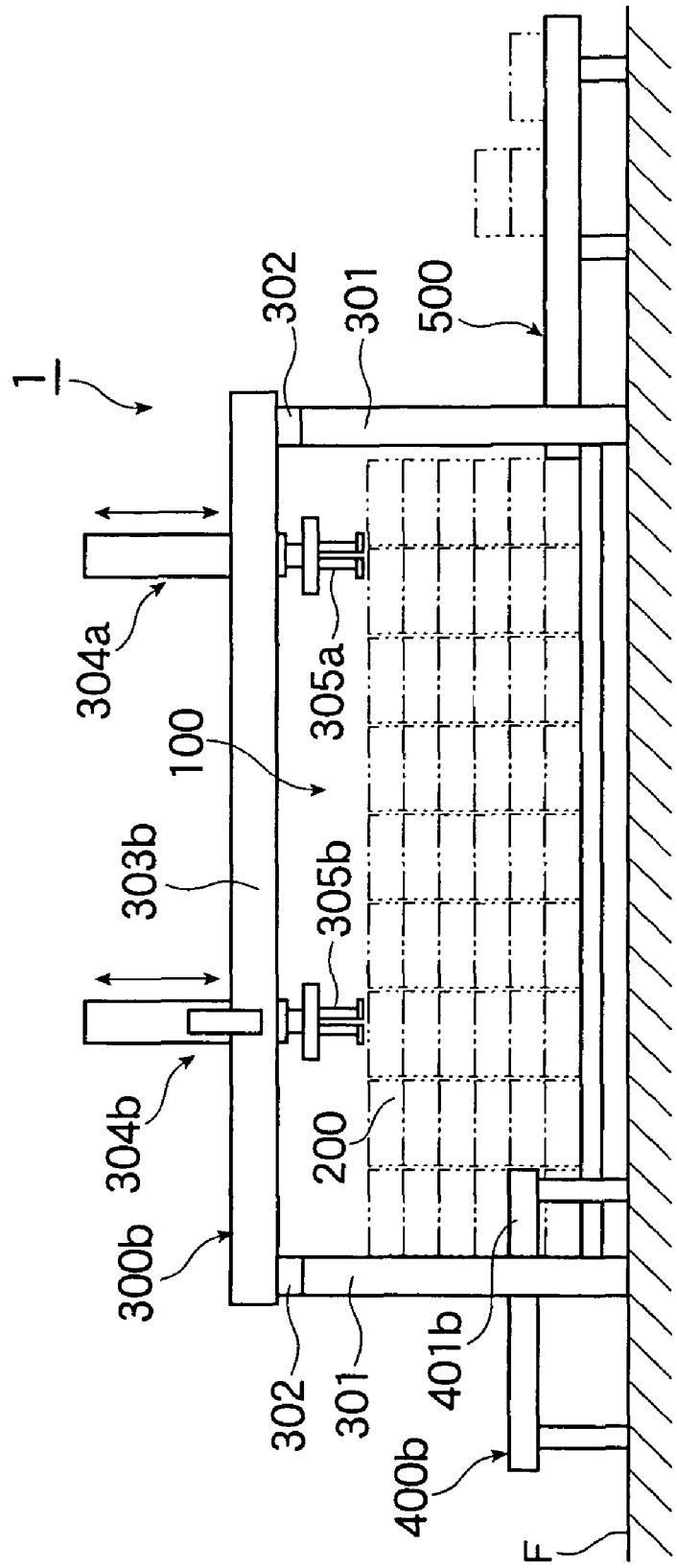

OVERHEAD TRANSFER/STORAGE SYSTEM AND OVERHEAD TRANSFER/STORAGE METHOD

FIELD OF THE INVENTION

The present invention relates to an overhead conveyance/storage system and an overhead conveyance/storage method. More particularly, the present invention relates to an overhead conveyance/storage system and an overhead conveyance/storage method both high in the degree of space utilization and that of floor surface utilization, high in the efficiency of a product loading work to a storage area and also high in the efficiency of a product unloading work from the storage area, and suitable for application to a storage warehouse for the storage of plural products of various types and various sizes.

BACKGROUND ART

According to a conventional product storage system for the storage of products (products for storage) of different outline sizes onto a field of a storage warehouse, products of different kinds for storage are stacked and stored kind by kind at predetermined positions on a field plane serving as a storage area, the products of different types being disposed adjacent one another longitudinally and transversely. For carrying out a product of the kind required in the next process from the storage area according to predetermined directions, a transfer device transfers this product onto a pallet which is standing by at a predetermined position of a delivery area, then when a predetermined number of products of the same kind are thus placed onto the pallet, the pallet is carried out from the delivery area and conveyed to the next process (Patent Literature 1).

According to another conventional product storage system, storage areas are disposed respectively on both sides (one on each side) of a conveyor, products on the conveyor are taken out by respective moving mechanisms (transfer devices), then moved and stored in the respective storage areas, and products of the kind required in the next process are carried out from the storage areas according to predetermined directions. In this case, the products are taken out by the moving mechanisms, then are transferred again onto the conveyor and carried out to the exterior of the storage areas (Patent Literature 2).

However, in the storage system described in Patent Literature 1, problems are encountered at the time of carrying out a product from the storage area. More particularly, since a product receiving position of a conveyance device is an arbitrary position around the storage area, the distance between the position of the stored product and the product receiving position is not stable, and in a certain storage condition of the product the distance between the product storage position and the product receiving position becomes longer, resulting in a transfer operation of a long distance. If such a transfer operation becomes more frequent, the time required for the unloading work becomes longer and the efficiency of the unloading work, and hence the efficiency of the storage work, is greatly deteriorated.

A transfer device is used to perform the storage work, the work being product transfer operation between the storage area and the exterior of the storage area. The transfer device is made up of a first transfer device for the transfer of a product to the storage area which product is carried in from the exterior of the storage area (from the preceding process) and a second transfer device for the transfer of a product to an unloading position which product is to be carried out from the storage area to the exterior of the storage area (to the succeeding process). Thus, two separate transfer devices are used, one being dedicated to storage use and the other to unloading use. Therefore, if any one transfer device is turned OFF for maintenance or any other reason, the operation of the other transfer device is limited to a partial operation in the storage area and hence the influence of a decrease of production on the preceding or succeeding process becomes more significant.

In the storage system described in Patent Literature 2, since one storage area is disposed on each side of the product conveyor, the number of products stored in the storage areas is smaller than in the storage system having a conveyor which conveys products via a storage area. Moreover, the transfer device for the transfer of products between each storage area and the conveyor can move in only the range of one storage area, so when the transfer device is turned OFF for maintenance or any other reason, the storage work in one storage area stops completely and hence the efficiency of the storage work is deteriorated markedly.

Further, in each of the storage systems described in both patent literatures, it is only one transfer device that can make access to both loading position of the loading device which is for carrying in products from the exterior of the storage area (from the preceding process) to the storage area and unloading position of the unloading device which is for carrying out products from the storage area to the exterior of the storage area (to the succeeding process). Thus, both conventional storage systems in question are unsuitable for storage of a large quantity of products.

Patent Literature 1: Japanese Patent Laid-Open Publication No. 2000-238906

Patent Literature 2: Japanese Patent Laid-Open Publication No. 2001-031219

DISCLOSURE OF THE INVENTION

Problems to be Solved by the Invention

An object of the present invention is to solve the above-mentioned problems of the conventional overhead conveyance/storage system and overhead conveyance/storage method and provide an overhead conveyance/storage system and an overhead conveyance/storage method both high in the degree of space utilization and that of floor surface utilization and also high in the efficiency of the work for loading products to a storage area and the work for unloading products from the storage area.

Means for Solving the Problems

The above-mentioned object of the present invention can be achieved by the following overhead conveyance/storage system and overhead conveyance/storage method.

That is, according to the present invention, there is provided an overhead conveyance/storage system comprising at least a product storage area, at least one transfer/holding means adapted to move through a ceiling space in the storage area in three-dimensional directions comprising vertical, transverse and longitudinal directions while holding a product, and unloading means for carrying out the product from the storage area, in which a product receiving position of the unloading means for receiving the product is approximately the center of the storage area when seen in plan.

According to the overhead conveyance/storage system, the balance of the distance from the position of the product stored in the storage area up to the product receiving position of the unloading means (the product receiving position is a product unloading position of the unloading means, serving as a starting point of the product unloading work performed by the unloading means) is improved and hence the efficiency of the unloading work is improved.

According to a preferred embodiment, the overhead conveyance/storage system further comprises loading means for carrying a product into the storage area. With this construction, the efficiency of the product storage work (loading work and unloading work), including the product loading operation to the storage area, is improved.

According to another preferred embodiment, the number of product carried at a time into the storage area by the loading means is at least one. With this construction, the efficiency of the product storage work (loading work and unloading work), including the product loading operation to the storage area, is further improved.

According to a further preferred embodiment, the overhead conveyance/storage system further comprises at least one product discriminating means for acquiring information on an incoming product and discriminating the product on the basis of the acquired information, the product discriminating means being disposed in the loading means. With this construction, the most suitable storage work can be done on the basis of the information on the incoming product. For example, by acquiring information on the type and size of each product, products can be classified kind by kind and stored in this classified state in the storage area. In the case of an incoming product different from the product to be stored in the storage area, there is made kind abnormal detection and a predetermined abnormal processing is performed, whereby it is possible to carry out an optimum storage work.

According to a still further preferred embodiment, the unloading means is a conveyor. With this construction, it is possible to convey products continuously to the next process and hence the efficiency of the unloading work is further improved.

According to a still further preferred embodiment, the unloading means includes product placing means which can place at least one product thereon. With this construction, the work for selecting and gathering plural products of a predetermined kind from among plural products stored in the storage area can be done simultaneously with the unloading work, whereby it is possible to attain both reduction of the equipment cost and effective utilization of the equipment installing space.

According to a still further preferred embodiment, the overhead conveyance/storage system further comprises at least two transfer/holding means, an operation range of one transfer/holding means being one storage area range including the product receiving position of the unloading means and an operation range of the other transfer/holding means-being the other storage area range including the product receiving position of the unloading means. With this construction, the operation range is divided for each transfer/holding means, so that it is possible to minimize an overlapping range of different transfer/holding means, that is, it is not required to pay attention to overlapping of operations. Consequently, it becomes easier to control the operations of those transfer/holding means.

According to a still further preferred embodiment, when one transfer/holding means is suspended, the other transfer/holding means can operate over all the storage area ranges. With this construction, even if one transfer/holding means becomes unusable temporarily for maintenance or any other reason, the other transfer/holding means can perform the storage work over all the storage area ranges, so that it is possible to diminish the influence on other processes.

According to a still further preferred embodiment, the operation range of one transfer/holding means and that of the other transfer/holding means overlap each other, and one transfer/holding means and the other transfer/holding means can make access simultaneously to different products stored in the overlapping operation range. With this construction, products can be stored in and taken out from the overlapping range without mutual interference of the transfer/holding means, so that the efficiency of the product storage work is further improved.

According to a still further preferred embodiment, the overhead conveyance/storage system further comprises control means, the control means storing a plurality of address spaces corresponding to a plurality of actual storage spaces set by dividing the storage area for each type and size of plural products of various types and various sizes, updating the address spaces in accordance with the result of discrimination made by the product discriminating means and the result of unloading performed by the unloading means after transferring by the transfer/holding means one or plural stacked products of the same type and same size to the product receiving position of the unloading means, thereby managing the actual storage spaces, and performing a predetermined drive control for the transfer/holding means and the unloading means. With this construction, since the storage place and a vacancy condition thereof with respect to products of each of various kinds (various types and sizes), which storage place and vacancy condition vary depending on the kind and quantity of incoming and outgoing products, are managed in terms of the address spaces, it is possible to utilize the storage area widely without such a problem as is encountered in case of managing the storage place and vacancy condition in terms of the actual storage spaces, i.e., the storage area being narrowed by providing partitions in the actual storage spaces to make distinction of products. Besides, such an installation work as providing partitions in the actual storage spaces is not needed. Products can be classified, stored and managed in the storage area in an easy and inexpensive manner. Further, it becomes possible to make a remote management of the storage area.

According to the present invention, there is also provided an overhead conveyance/storage method comprising at least the steps of dividing a storage area, the storage area being for classifying products by predetermined kinds and storing the classified products, into a plurality of actual storage spaces each for storing one or plural stacked products of the same type and same size, the actual storage spaces being set by dividing the storage area for each type and size of the plural products of various types and sizes; setting address spaces to be stored in control means correspondingly to the actual storage spaces; moving the products in the storage area in three-dimensional directions comprising vertical, transverse and longitudinal directions while holding the products by at least two transfer/holding means; and carrying out the products by unloading means from a predetermined nearly central position of the storage area when seen in plan, in which a product of a kind directed by predetermined directions is selected from among plural products stored in the storage area, then is transferred to the predetermined position in the unloading step and is carried out to the exterior of the storage area, and the address spaces are updated in accordance with the unloading result to thereby manage the actual storage spaces.

According to the overhead conveyance/storage method, the step of dividing the storage area into plural actual storage spaces, the step of setting address spaces stored in the control means correspondingly to the actual storage spaces, the step of moving the products in the storage area in three-dimensional directions while holding the products by at least two transfer/holding means, and the step of carrying out the products by unloading means from a predetermined nearly central position of the storage area when seen in plan, are carried out in order, whereby the address spaces are updated in accordance with the product unloading result and hence it is possible to manage the actual storage spaces.

Substantially, the storage place and a vacancy condition thereof with respect to products of each of various kinds (various types and sizes), which storage place and vacancy condition vary depending on the kind and quantity of outgoing products, are managed in terms of address spaces. Therefore, unlike the case of making the management in terms of actual storage spaces, there is no fear of the storage area being narrowed by providing partitions in the actual storage spaces to make distinction of products, and thus it is possible to utilize the storage area widely. Besides, the work for installing partitions in the actual storage spaces is not needed and products can be classified, stored in the storage area and managed in an easy and inexpensive manner. Further, it becomes possible to make a remote management of the storage area.

According to the overhead conveyance/storage method in question, moreover, the balance of the distance from a product position in the storage area up to the product receiving position in the unloading means is improved and the efficiency of the unloading work becomes higher. Besides, it is possible to minimize the overlapping range of different transfer/holding means, resulting in that it is no longer necessary to pay attention to overlapping of operations and hence it becomes easier to control the transfer operations of those transfer/holding means.

Further, according to the overhead conveyance/storage method in question, there are provided at least two transfer/holding means, so even if one transfer/holding means becomes unusable temporarily for maintenance or any other reason, the other transfer/holding means can effect the storage work for at least a part of the storage area and hence it is possible to diminish the influence on the other processes.

According to a preferred embodiment, a product placing member capable of placing a plurality of products thereon is provided in a predetermined position in the unloading step (the predetermined position is a product receiving position of the unloading means, serving as a starting point of the product unloading work performed by the unloading means), a product of the kind directed by predetermined directions is selected from among plural products stored in the storage area, then a predetermined number of the products are stacked onto the product placing member provided at the predetermined position in the unloading step and are carried out to the exterior of the storage area. With this construction, the work of selecting and gathering plural products of a predetermined kind from among plural products stored in the storage area can be done simultaneously with the unloading work, whereby it is possible to attain both reduction of the equipment cost and effective utilization of the equipment installing space.

According to another preferred embodiment, the overhead conveyance/storage method further comprises the step of acquiring information on a product incoming to the storage area and discriminating the product on the basis of the information, and the product is stored at a predetermined position in the storage area by the transfer/holding means on the basis of the product information acquired in the product discriminating step, and further, the actual storage spaces are managed by updating the address spaces in accordance with the product information and the unloading result. With this construction, an optimum storage work can be conducted on the basis of information on an incoming product. For example, by acquiring information on the type and size of products, it becomes possible to classify products kind by kind in their storage in the storage area. In the case of an incoming product different from a predetermined product to be stored in the storage area, there is made kind abnormal detection of the product and a predetermined abnormal processing is performed, whereby it is possible to carry out an optimum storage work.

According to a still further preferred embodiment, not only the product unloading result but also the product information acquired as a result of execution of the product discriminating step is utilized in managing the actual storage spaces by updating the address spaces, and the storage place and a vacancy condition thereof with respect to products of each of various kinds (various types and sizes), which storage place and vacancy condition vary depending on the kind and quantity of incoming and outgoing products, are managed in terms of the address spaces. Therefore, the foregoing problems encountered in case of managing the storage place and vacancy condition in terms of the actual storage spaces can be solved to a more satisfactory extent and the foregoing effects attained by the overhead conveyance/storage method can be exhibited in a more outstanding manner.

Effect of the Invention

In the overhead conveyance/storage system according to the present invention, the balance of the distance from the position of products stored in the storage area up to the product receiving position of the unloading means is improved, thereby improving the unloading work efficiency. Besides, the efficiency of the product storage work (loading work and unloading work), including the product loading work to the storage area, is improved. Moreover, since an incoming product can be conveyed directly, without storage, to the receiving position of the unloading means, the storage work efficiency is further improved.

In the case where at least two transfer/holding means are provided, it is possible to minimize an overlapping range of different transfer/holding means and hence it is no necessary to pay attention to the overlapping of operations. Consequently, it becomes easier to make a drive control for those transfer/holding means. Even when one transfer/holding means becomes unusable temporarily for maintenance or any other reason, the other transfer/holding means can perform the storage work for at least a part of the storage area, thus making it possible to diminish the influence on the other processes.

As described above, the overhead conveyance/storage system may further comprise control means, the control means storing a plurality of address spaces corresponding to a plurality of actual storage spaces set by dividing the storage area for each type and size of plural products of various types and various sizes, updating the address spaces in accordance with the result of discrimination made by the product discriminating means and the result of unloading performed by the unloading means after transferring by the transfer/holding means one or plural stacked products of the same type and same size to the product receiving position of the unloading means, thereby managing the actual storage spaces, and performing a predetermined drive control for the transfer/holding means and the unloading means. In this case, the storage place and a vacancy condition thereof with respect to products of each of various kinds (various types and sizes), which storage place and vacancy condition vary depending on the kind and quantity of incoming and outgoing products, are managed in terms of the address spaces. Therefore, it is possible to utilize the storage area widely without such a problem as is encountered in case of managing the storage place and vacancy condition in terms of the actual storage spaces, i.e., the storage area being narrowed by providing partitions in the actual storage spaces to make distinction of products. Besides, such an installation work as providing partitions in the actual storage spaces is not needed. Products can be classified, stored and managed in the storage area in an easy and inexpensive manner. Further, it becomes possible to make a remote management of the storage area.

Further, with the overhead conveyance/storage method according to the present invention, it is possible to obtain the same effects as the above effects obtained by using the overhead conveyance/storage system according to the present invention.

Additionally, there can be attained such various effects as described above.

BRIEF DESCRIPTION OF THE DRAWINGS

FIGS. 5A to 5E are diagrams for explaining how to perform product loading and unloading works in the overhead conveyance/storage system of the first embodiment in comparison with a conventional counterpart, of which:

FIG. 5A is a diagram for explaining how to perform a loading work;

FIG. 5B is a diagram for explaining how to perform an unloading work;

FIG. 5C is a diagram for explaining how to perform another loading work;

FIG. 5D is a diagram for explaining how to perform another unloading work; and

FIG. 5E is a diagram for comprehensively explaining how to perform both loading and unloading works.

FIG. 6 is a plan view of an overhead conveyance/storage system according to a second embodiment of the present invention.

FIG. 7 is a front view thereof.

EXPLANATION OF REFERENCE NUMERALS

Figure 1:
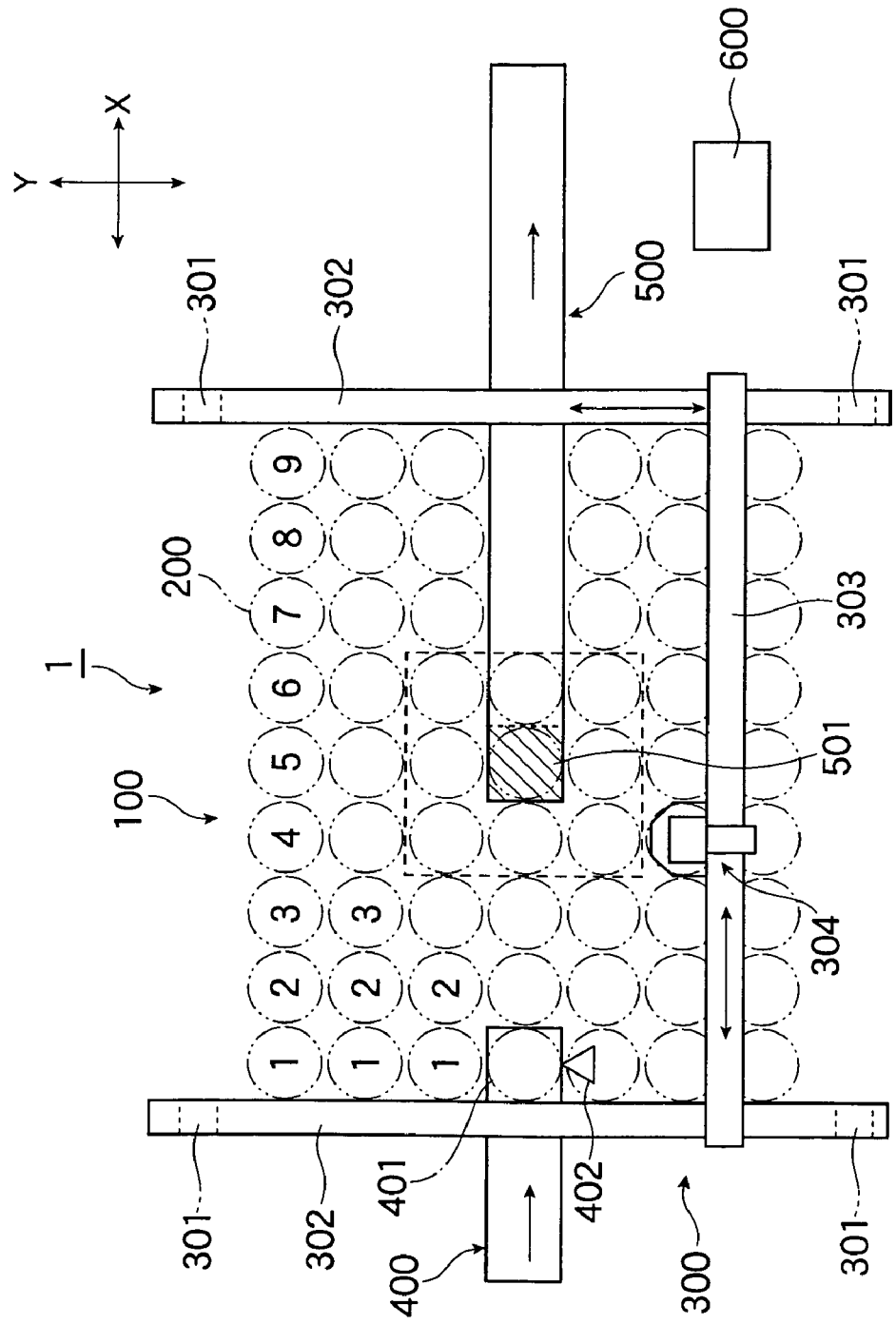
FIG. 1 is a plan view of an overhead conveyance/storage system according to a first embodiment of the present invention.

1: overhead conveyance/storage system, 100: storage area, 200: tire (product), 300, 300a, 300b, 300c: transfer/holding means, 301: support post, 302: fixed guide rail, 303, 303a, 303b, 303c: traveling guide rail, 304, 304a, 304b, 304c: horizontal/vertical moving mechanism, 305, 305a, 305b: storage product holding mechanism, 400, 400a, 400b, 400c: loading means (conveyor), 401, 401a, 401b, 401c: tire loading position, 402, 402a, 402b: product discriminating means, 500: unloading means (conveyor), 501, 501', 501a, 501b, 501c, 501d: tire unloading position (product receiving position), 502: pallet, 503: conveyor, 503a: pallet loading conveyor, 503b: pallet unloading conveyor, 504, 505: transfer means, 600: control means, 700: palletizing area, F: floor surface

BEST MODE FOR CARRYING OUT THE INVENTION

The overhead conveyance/storage system according to the present invention includes at least a product storage area, at least one transfer/holding means adapted to move through a ceiling space in the storage area in three-dimensional directions, i.e., vertical, transverse and longitudinal directions, while holding a product, and unloading means for carrying out the product from the storage area, in which a product receiving position of the unloading means is approximately the center of the storage area when seen in plan.

The overhead conveyance/storage system further comprises loading means for carrying a product into the storage area, at least one product discriminating means disposed in the loading means and adapted to acquire and discriminate information on an incoming product, and control means. The control means stores a plurality of address spaces corresponding to a plurality of actual storage spaces set by dividing the storage area for each type and size of plural products of various types and various sizes, updates the address spaces in accordance with the result of discrimination made by the product discriminating means and the result of unloading performed by the unloading means after transferring by the transfer/holding means one or plural stacked products of the same type and the same size to the product receiving position of the unloading means, thereby manages the actual storage spaces, and performs a predetermined drive control for the transfer/holding means and the unloading means.

The overhead conveyance/storage method according to the present invention comprises at least the steps of dividing a storage area, the storage area being for classifying products by predetermined kinds and storing the classified products, into a plurality of actual storage spaces each for storing one or plural stacked products of the same type and same size, the actual storage spaces being set by dividing the storage area for each type and size of the plural products of various types and sizes; setting address spaces stored in the control means correspondingly to the actual storage spaces; moving the products in the storage area in three-dimensional directions comprising vertical, transverse and longitudinal directions while holding the products by at least two transfer/holding means; and carrying out the products by unloading means from a predetermined nearly central position of the storage area when seen in plan, in which a product of a kind directed by predetermined directions is selected from among plural products stored in the storage area, then is transferred to the predetermined position in the unloading process and is carried out to the exterior of the storage area, and the address spaces are updated in accordance with the unloading result to thereby manage the actual storage spaces.

Embodiments

Next, a first embodiment of the present invention will be described below.

The overhead conveyance/storage system according to the present invention is suitable for application to a storage warehouse which stores plural products of various types and various sizes. In such a storage warehouse, its storage area is divided by types and sizes of plural products and one divided area is allocated to a certain type and size of plural products. In each divided area, one or plural stacked products of the same type and size are stored. A description will be given below with reference to an example in which the product stored (storage product) is a tire. The storage product is not limited to the tire. Various kinds of products may be stored in a mixed state.

Figure 2:
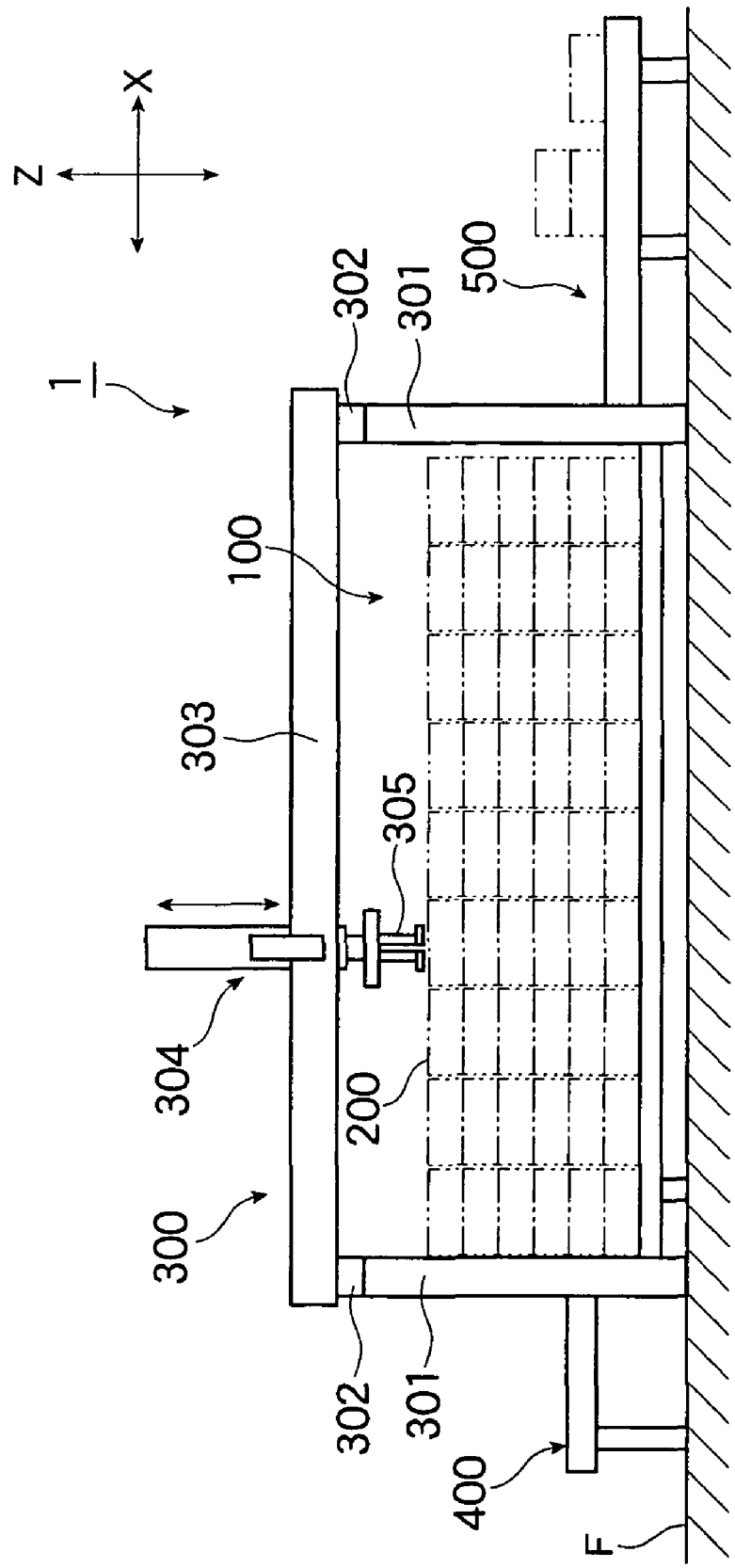
FIG. 2 is a front view thereof.
Figure 3:
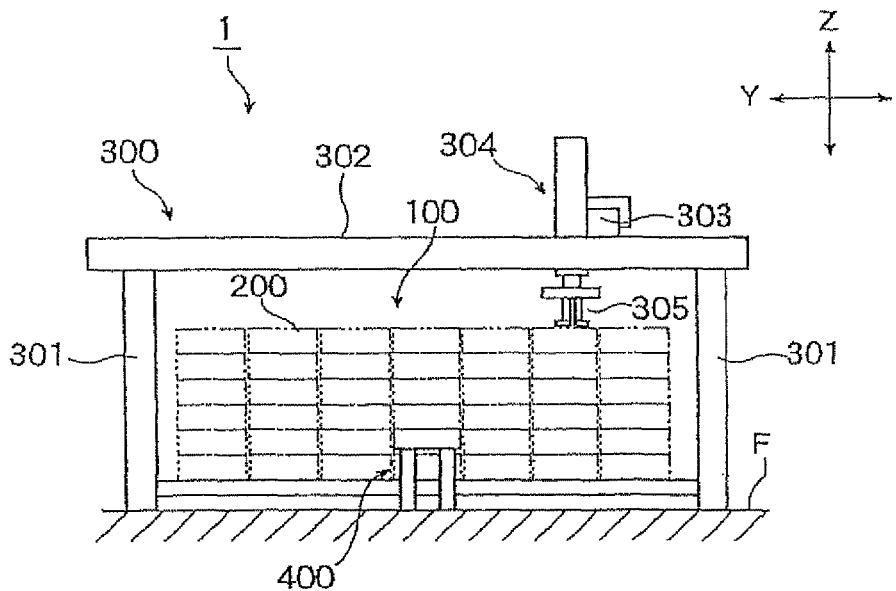
FIG. 3 is a left side view thereof.
Figure 4:
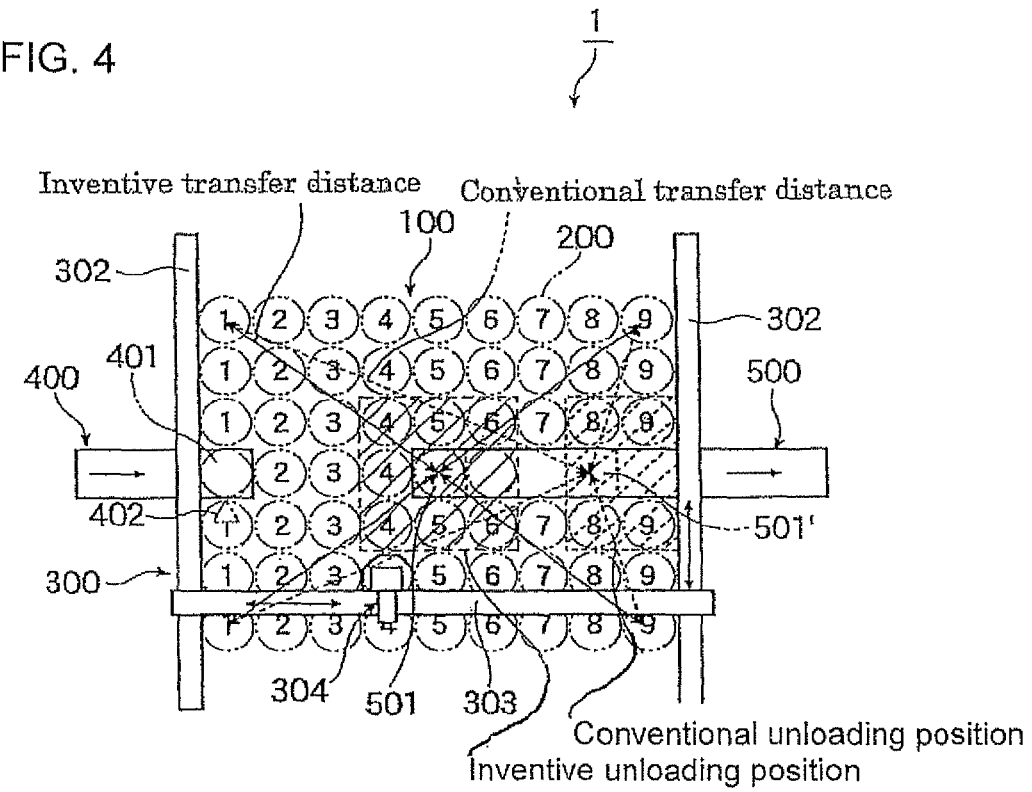
FIG. 4 is a diagram for explaining a difference between the overhead conveyance/storage system of the first embodiment and a conventional overhead conveyance/storage system.

FIGS. 1 to 3 illustrate a schematic construction of an overhead conveyance/storage system according to a first embodiment of the present invention.

As shown in those figures, the overhead conveyance/storage system 1 of the first embodiment includes a storage area 100 for the storage of tires 200, transfer/holding means 300 adapted to move through a ceiling space in the storage area 100 in three-dimensional directions, i.e., vertical, transverse and longitudinal directions, while holding a tire 200, and loading means 400 for carrying the tire 200 into the storage area 100, and unloading means 500 for carrying out the tire 200 from the storage area 100.

There are various sizes of tires 200. In FIG. 1, one or plural stacked such tires are stored in each of areas divided longitudinally and transversely. The tires 200 stored in each divided area are of the same size. In FIG. 1, there is shown a state in which one or plural stacked tires 200 are stored in each of all the divided areas. In all of the divided areas the tires 200 are depicted at the same size, but actually tires of various sizes are stored in a mixed state as a whole.

In the state of FIG. 1, groups of the tires 200 are represented in terms of column numbers in X direction and are each called a tire group of $n^{th}$ column. In the state of FIG. 1, n=1, 2 . . . 9, and a tire group of $n^{th}$ column includes plural rows (seven rows in FIG. 1) of tires 200 in Y direction.

The transfer/holding means 300 is a three-dimensional moving mechanism erected on a floor surface F, which is roughly constructed as follows.

As shown in FIGS. 1 to 3, four support posts 301 are erected on the floor surface F and a pair of horizontal fixed guide rails 302 are disposed in parallel in Y direction while being supported by the four support posts 301. One traveling guide rail 303 is mounted on the pair of fixed guide rails 302 so as to straddle the guide rails and movable in Y direction along X direction. A traveler capable of traveling along the traveling guide rail 303 is installed within the traveling guide rail 303 and a horizontal/vertical moving mechanism 304 which incorporates therein a lift mechanism capable of moving in the vertical direction is attached to the traveling guide rail 303 in a suspended manner. A storage product holding mechanism 305 is attached to a lower end of the horizontal/vertical moving mechanism 304, and a pawl attached to the storage product holding mechanism 305 grasps a tire 200.

Thus, one horizontal moving mechanism is constituted by the four support posts 301, the pair of fixed guide rails 302, one traveling guide rail 303 and one traveler installed within the horizontal/vertical moving mechanism 304. Further, by the addition thereto of one lift mechanism installed within the horizontal/vertical moving mechanism 304, there is constituted one three-dimensional moving mechanism, in other words, one transfer/holding means 300.

As to detailed structures of such horizontal moving mechanism and three-dimensional moving mechanism, reference can be made to Japanese Patent Laid-Open Publication No. 2003-72944 filed by the applicant in the present case.

The loading means 400 is usually constituted by a conveyor and is installed on the floor surface F which is in contact with a central portion on one side (left side in FIG. 1) out of two sides parallel to the fixed guide rails 302 in the storage area 100 of a rectangular shape in plan. The loading means 400 conveys tires 200 in order to the storage area 100 after having gone through the preceding process. A tire loading position 401 provided at a front end portion of the loading means 400 enters the interior of the storage area 100 up to the position of the tire 200 which is located at the center in plan of the tire group of the first column in X direction. The tire loading position 401 replaces the tire 200 and permits one tire 200 to be placed thereon. At this position, an incoming tire 200 is grasped by the storage product holding mechanism 305 and is conveyed to a predetermined position (divided area) in the storage area 100 by the transfer/holding means 300 in accordance with the result of discrimination made by product discriminating means 402 which is disposed in the loading means 400. The product discriminating means 402 acquires information (e.g., size) of the incoming tire 200 with use of, for example, bar code or ID and makes discrimination.

The unloading means 500 is also usually constituted by a conveyor and a tire unloading position 501 provided at a base end portion thereof is disposed nearly centrally of the storage area 100 when seen in plan. The conveyor in question extends in X direction from the tire unloading position 501 toward an opposite end (right end in FIG. 1) of the storage area 100, then further extends to the exterior of the storage area 100. In this state the conveyor is installed on the floor surface F. The conveyor conveys the tire 200 placed thereon to the next process.

The tire unloading position 501 is the position in which the unloading means 500 receives the tire 200 to be carried out. In the illustrated example, the tire unloading position 501 lies at a central part (the fourth row in Y direction) in plan of the fifth column tire group in X direction and can rest one tire 200 thereon. A tire 200 stored within the storage area 100 is grasped by the storage product holding mechanism 305 and is transferred to the tire unloading position 501 by the transfer/holding means 300. The tire unloading position 501 may lie at the position of any of the tires which surround one tire located at the central part in plan of the fifth column tire groups in X direction, (the position of any of the tires lying within range enclosed with a chain line in FIG. 1). The tire unloading position 501 need not always lie at the very center of the storage area 100 when seen in plan. It may lie approximately centrally of the storage area.

Though not shown in detail, the overhead conveyance/storage system of the first embodiment further includes control means 600. The control means 600 stores plural address spaces corresponding to plural such actual storage spaces as illustrated in the drawing, the actual storage spaces being set by allocating the storage area 100 to each of various sizes of tires 200. The control means 600 updates the address spaces in accordance with the result of discrimination made by the product discriminating means 402 and the result of unloading performed by the unloading means 500 after transferring by the transfer/holding means one or plural stacked tires 200 of the same size to the tire unloading position (product receiving position) 501 of the unloading means 500, thereby managing the actual storage spaces. The control means 600 further makes a predetermined drive control for the transfer/holding means 300 and the unloading means 500.

Thus, actually, it is not that the storage area 100 is divided for each of various types and sizes of plural products on the floor surface F by partitioning members and equipment.

Next, with reference to FIG. 4 and FIGS. 5A to 5E, a description will be given below about the difference between the overhead conveyance/storage system of the first embodiment and a conventional overhead conveyance/storage system.

In the overhead conveyance/storage system 1 of the first embodiment, since the product receiving position (tire unloading position) 501 of the unloading means 500 lies nearly centrally of the storage area 100 when seen in plan, the balance of the distance from the position of the tires 200 stored in the storage area 100 to the product receiving position 501 is improved and hence the efficiency of the product unloading work becomes higher. For example, the distances from the positions of tires 200 stored at the four corners of the storage area 100 to the product receiving position 501 are almost equal (see four solid lines with arrows at both ends shown in FIG. 4). There exists no extremely long distance from the position of any tire 200 to the product receiving position 501. Thus, the efficiency of the product unloading work is high.

On the other hand, in the conventional overhead conveyance/storage system, a product receiving position (tire unloading position) 501' lies on an opposite side (right end side in FIG. 1) of the storage area 100, i.e., at a nearly central part in the product unloading-side area. In this case, the distance from the position of each of the tires 200 stored at both corners on one end (left end in FIG. 1) of the storage area 100 to the product receiving position 501' is much longer than the distance from the position of each of the tires 200 stored at both corners on the opposite end side (right end side in FIG. 1) of the storage area 100, (see four chain lines with arrows at both ends in FIG. 4). Thus, the balance of the distance up to the product receiving position 501' becomes worse and the efficiency of the product unloading work is deteriorated.

Figure 5A:
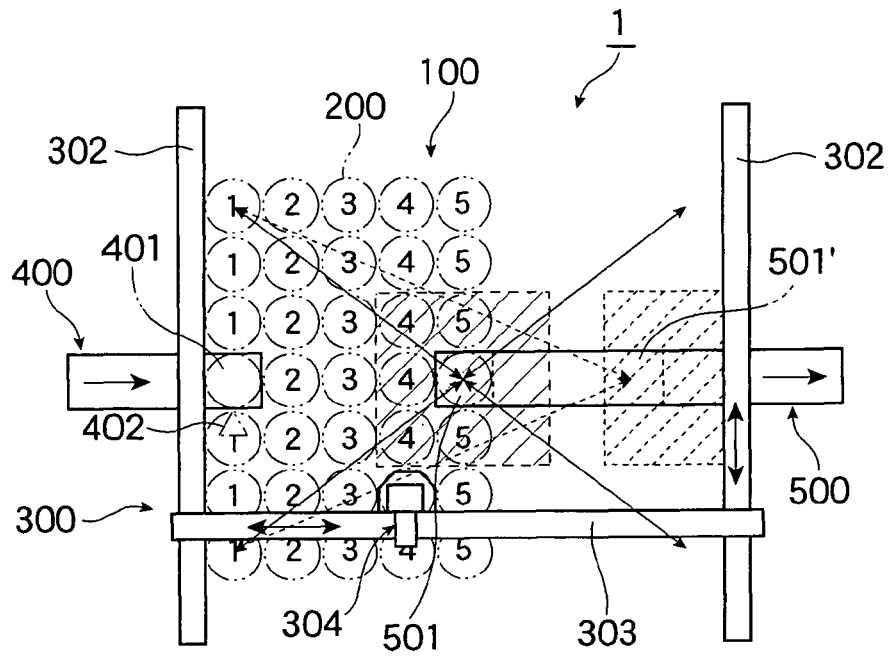

This difference will now be described in connection with loading and unloading methods performed by both systems. In FIG. 5A, when the tire 200 lying in the tire loading position 401 is to be stored in the storage area 100 at a short conveyance distance and in a high loading efficiency, the overhead conveyance/storage system 1 of the first embodiment adopts a storage sequence in the order of first, second . . . $n^{th}$ columns in X direction. On the other hand, in the conventional overhead conveyance/storage system, priority is given to the unloading efficiency and the storage sequence is like $n^{th}$ column (the final column, n=9 in the first embodiment) close to the product receiving position 501', $n-1^{th}$ column . . . first column.

Figure 5B:
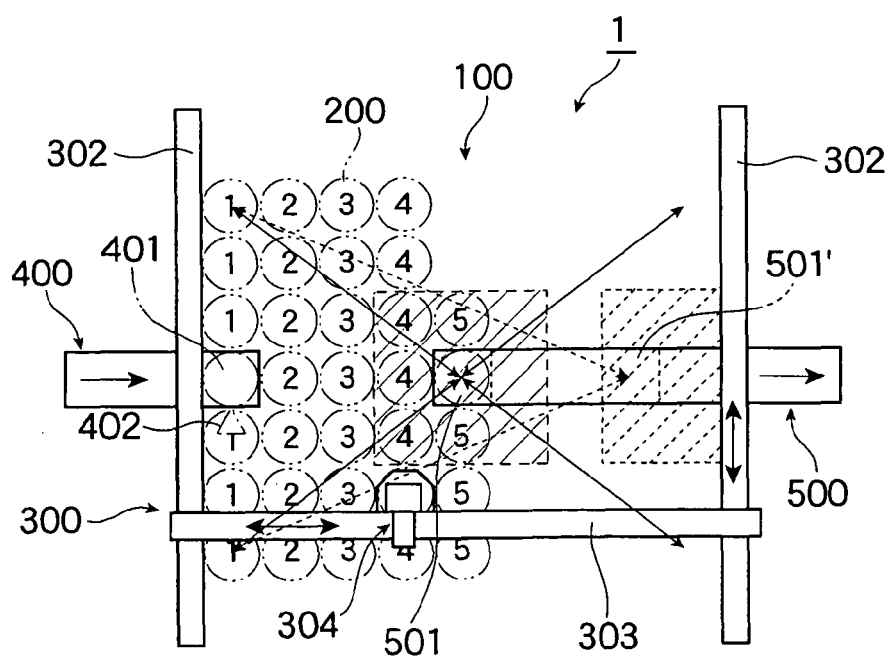

When the transfer/holding means 300 receives from the control means 600 a command that tires 200 stored in the storage area 100 be carried out and if there is no product loading for a certain time, the transfer/holding means 300 in the overhead conveyance/storage system 1 of the first embodiment performs an unloading operation for the tire 200. In this case, for efficient unloading, as shown in FIG. 5B, a tire 200 of a predetermined size stored at a position close to the tire unloading position (product receiving position) 501 is taken out and transferred to the tire unloading position 501. For example, tires of the fifth column are first carried out, and then the tires of the fourth or the third column are carried out.

Figure 5C:
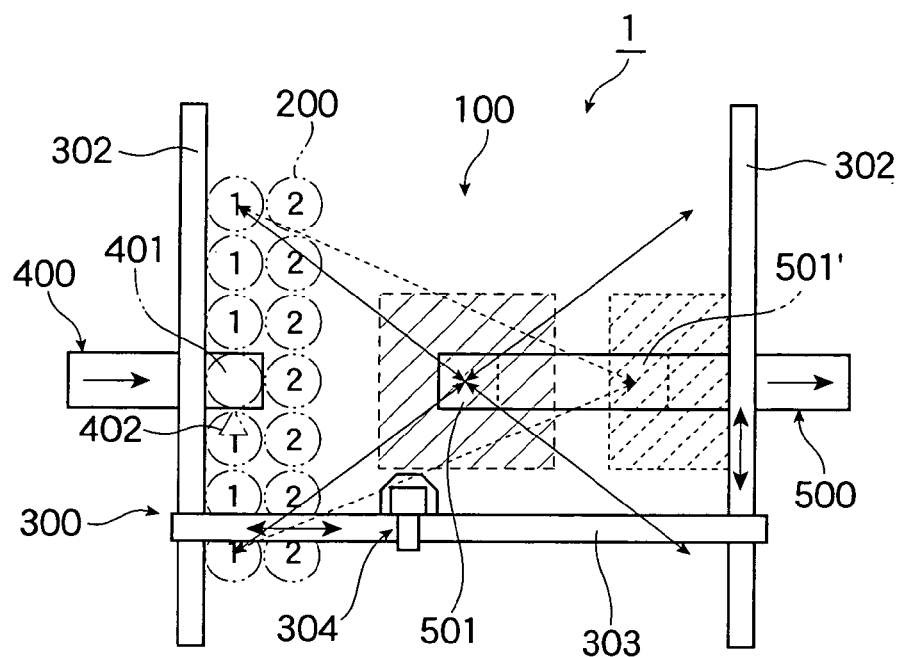

When the unloading work for the tires up to the third column, for example, as shown in FIG. 5C, is completed while this tire unloading operation is repeated and if a tire 200 again lies in the tire loading position 401, the unloading operation is suspended and the transfer/holding means 300 again performs the loading operation for the tire 200 in accordance with the method described above with reference to FIG. 5A. At this time, storage is started with tires lying in the third column.

Figure 5D:
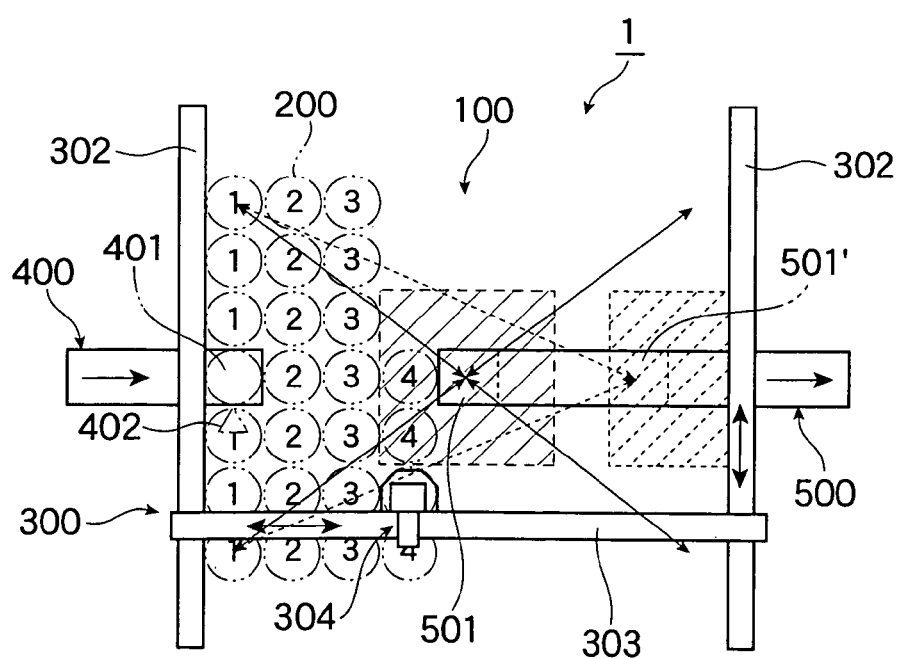
Figure 5E:
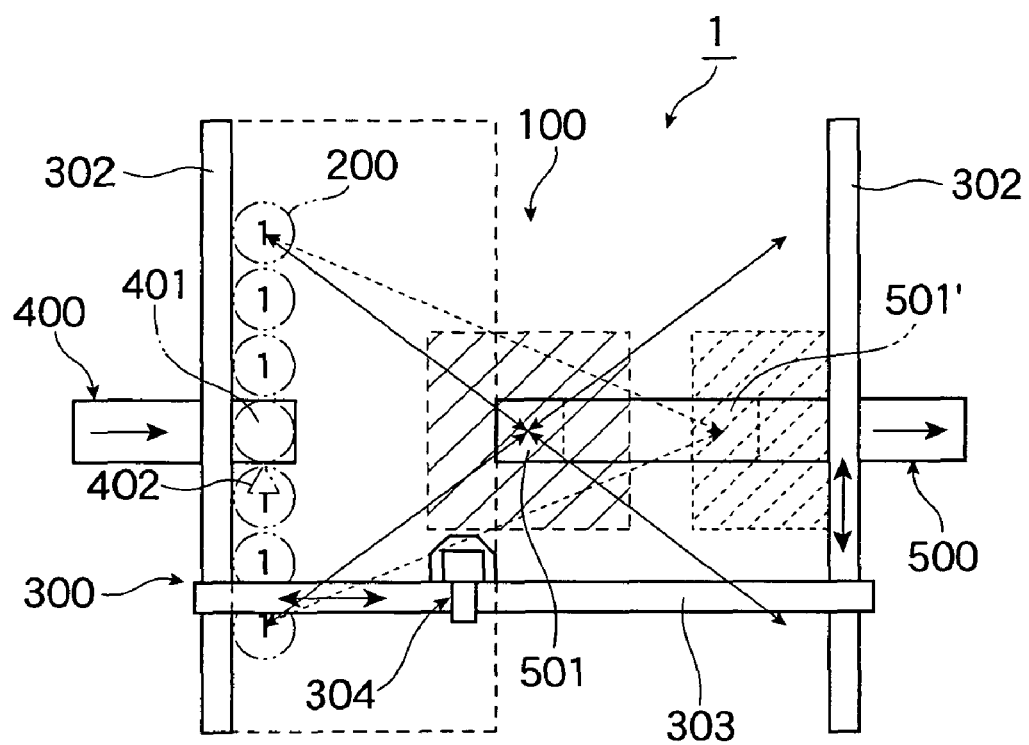

For example, when storage of the fourth column tires is half-completed and if again there is no loading of a tire 200 for a certain time, the transfer/holding means 300 again performs the tire unloading operation in accordance with the method described above with reference to FIG. 5B. At this time, the unloading operation is performed in the order of fourth column, third column, . . . , as shown in FIG. 5D.

In this way the tires 200 are stored in the storage area 100 while the transfer/holding means 300 repeats the loading and unloading operations in accordance with such loading and unloading methods described above in connection with FIGS. 5A to 5D. In this case, the storage area used is concentrated on the area close to the tire loading position 401. That is, the unloading work covers the tires 200 stored in the storage area distant from the conventional tire unloading position 501'. Consequently, in the conventional overhead conveyance/storage system, the efficiency of the unloading work lowers and so does the efficiency of the storage work. However, in the overhead conveyance/storage system 1 of the first embodiment, the unloading work is to carry out each tire 200 from the tire unloading position 501 located nearly centrally of the storage area 100 when seen in plan, so that the efficiency of the unloading work and hence the efficiency of the storage work are improved.

According to the above loading and unloading operations performed by the transfer/holding means 300, the tire 200 lying in the tire loading position 401 is once stored in the storage area 100, thereafter is transferred from the storage area 100 to the tire unloading position 501 and is carried out. However, when the tire 200 corresponding to predetermined directions is not stored in the storage area 100, but lies in the tire loading position 401, the tire may be transferred from the tire loading position 401 directly to the tire unloading position 501 and carried out.

Since the overhead conveyance/storage system 1 of the first embodiment is constructed as above, it is possible to obtain the following effects.

Since the tire receiving position (tire unloading position) 501 of the unloading means 500 lies nearly centrally of the storage area 100 when seen in plan, the balance of the distance from the position of each of the tires 200 stored in the storage area 100 to the tire receiving position 501 is improved and hence the efficiency of the unloading work becomes higher.

Besides, since the loading means 400 is provided, the efficiency of the tire loading work is improved. Moreover, since the unloading means 500 is a conveyor, tires 200 can be conveyed continuously to the next process, whereby the efficiency of the unloading work is improved. As a result, the efficiency of the storage work for the tires 200 is improved.

Further, since at least one product discriminating means 402 is provided in the loading means 400 for acquiring information on an incoming product and discriminating the product on the basis of the acquired information, an optimum storage work can be done on the basis of information on each incoming tire 200. For example, by acquiring information on the size of each tire 200, it becomes possible to classify tires 200 size by size for storage in the storage area 100. In the case of an incoming tire 200 different from the tire to be stored in the storage area 100, there is made kind abnormal detection of the tire and a predetermined abnormal processing is performed, whereby it is possible to perform an optimum storage work.

Further, the overhead conveyance/storage system further includes control means 600. The control means 600 stores plural address spaces corresponding to plural actual storage spaces, the actual storage spaces being set by dividing the storage area 100 for each size of plural tires 200 of various sizes. The control means 600 updates the address spaces in accordance with the result of discrimination made by the product discriminating means 402 and the result of unloading performed by the unloading means 500 after transferring by the transfer/holding means 300 one or plural stacked tires 200 of the same size to the tire unloading position (product receiving position) 501 of the unloading means 500, thereby managing the actual storage spaces, and performing a predetermined drive control for the transfer/holding means 300 and the unloading means 500. The storage place and a vacancy condition thereof with respect to tires 200 of each of various kinds (sizes), which storage place and vacancy condition vary depending on the kind (size) and quantity of incoming and outgoing tires 200, are managed in terms of the address spaces. Therefore, unlike the case where the management is made in terms of the actual storage spaces, the storage area 100 can be utilized widely without the fear of the storage area 100 being narrowed by the provision of partitions within the actual storage spaces to make distinction of products. Besides, such an installation work as providing partitions in the actual storage spaces is not needed. Products can be classified, stored and managed in the storage area 100 in an easy and inexpensive manner. Further, it becomes possible to make a remote management of the storage area 100.

Next, a description will be given below about a second embodiment of the present invention.

Figure 8:
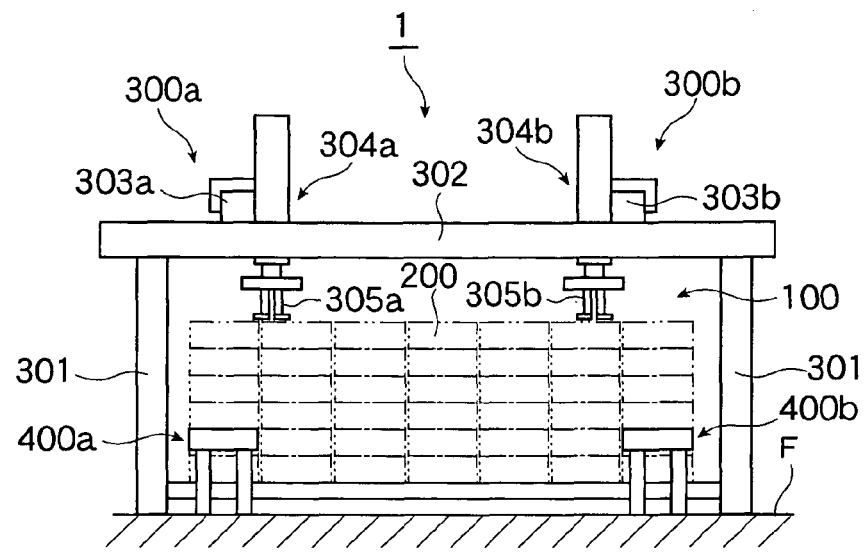
FIG. 8 is a left side view thereof.

FIG. 6 is a plan view of an overhead conveyance/storage system according to a second embodiment of the present invention, FIG. 7 is a front view thereof, and FIG. 8 is a left side view thereof.

Figure 9:
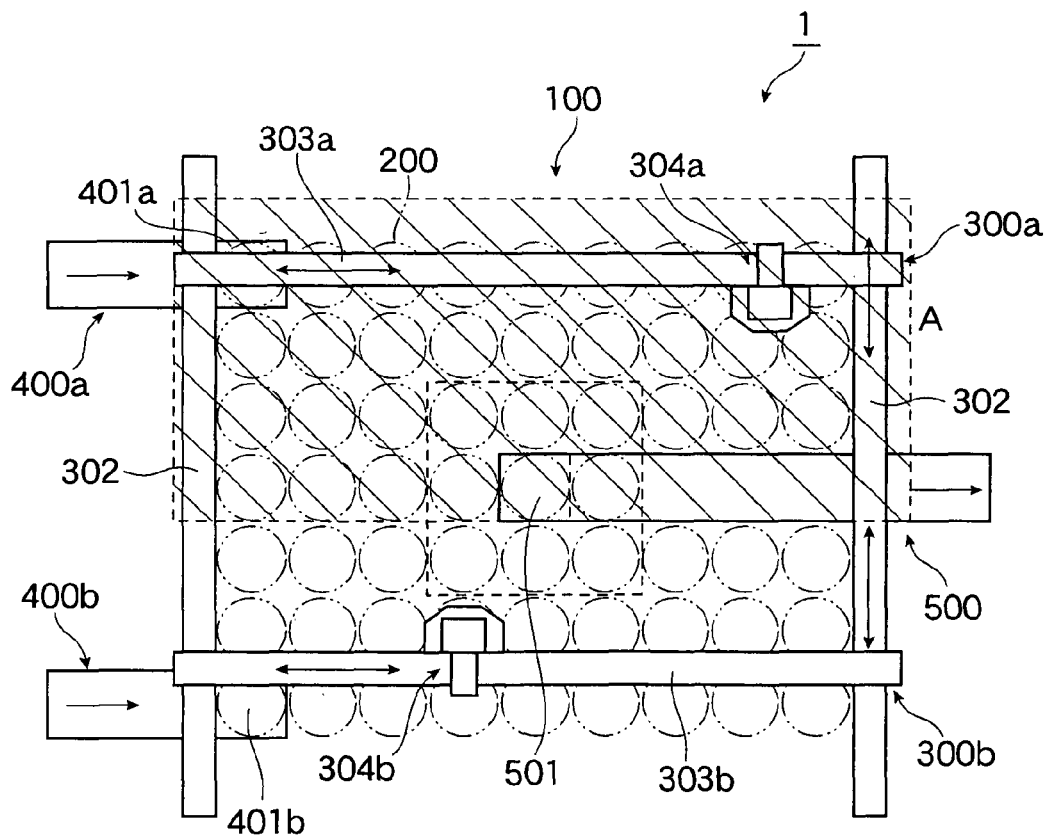
FIG. 9 is a diagram showing an operation range of one of a pair of transfer/holding means.
Figure 10:
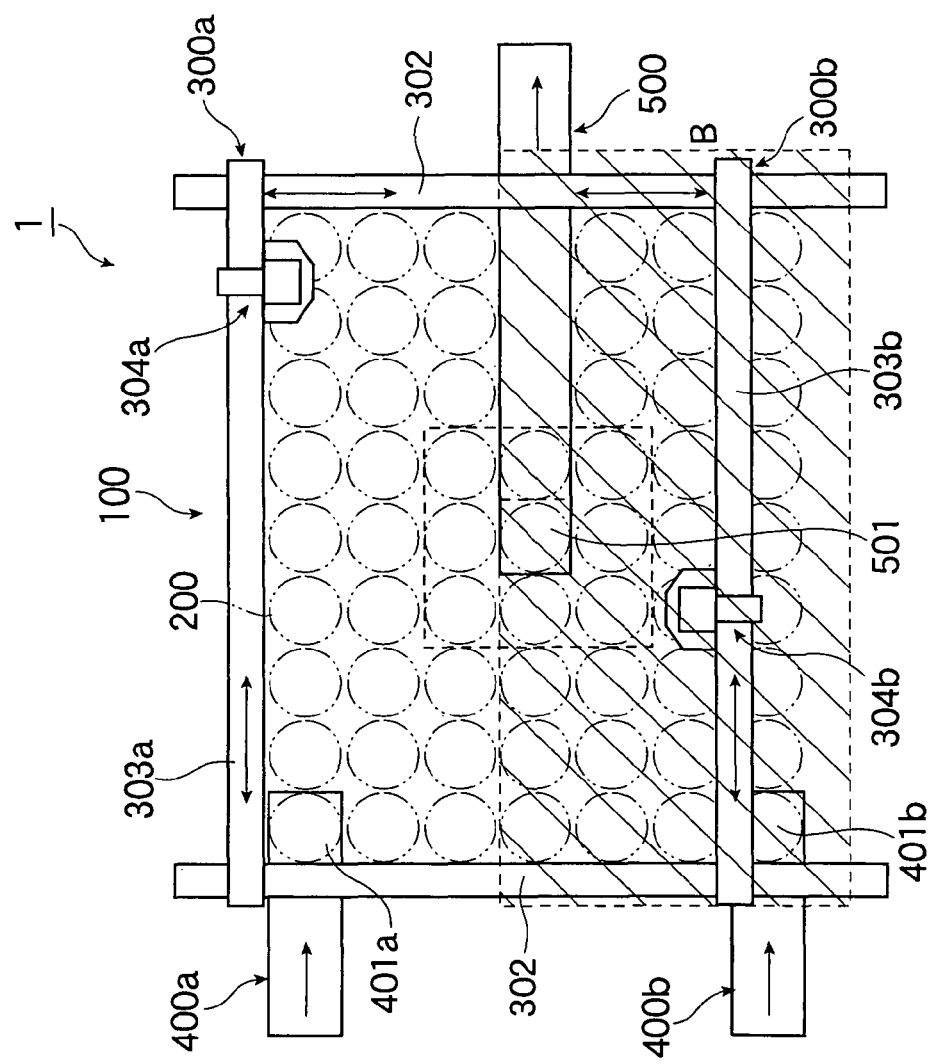
FIG. 10 is a diagram showing an operation range of the other transfer/holding means.

In an overhead conveyance/storage system 1 of the second embodiment, as compared with the overhead conveyance/storage system 1 of the previous first embodiment, a pair of transfer/holding means 300a, 300b and a pair of loading means 400a, 440b are included, as shown in FIGS. 6 to 8, instead of the transfer/holding means 300 and loading means 400 used in the overhead conveyance/storage system 1 of the first embodiment. An operation range of one transfer/holding means 300a is defined as one storage area range (see a hatched area A enclosed by a chain line in FIG. 9) including the tire unloading position (product receiving position) 501 of the unloading means 500, while an operation range of the other transfer/holding means 300b is another storage area range (see a hatched area B enclosed by a chain line in FIG. 10) including the tire unloading position 501 of the unloading means 500. Both systems are different in this point, but there are no other basically different points between the two.

To match the provision of the pair of loading means 400a and 400b, a pair of product discriminating means 402a and 402b are disposed in the loading means 400a and 400b, respectively.

The pair of transfer/holding means 300a and 300b use four support posts 301 and a pair of fixed guide rails 302 in common, and with these components are combined a pair of traveling guide rails 303a, 303b and a pair of horizontal/vertical moving mechanisms 304a, 304b, whereby the transfer/holding means 300a and 300b are constituted as a pair of three-dimensional moving mechanisms.

More specifically, in one transfer/holding means 300a out of the pair of transfer/holding means 300a and 300b, the traveling guide rail 30a and the horizontal/vertical moving mechanism 304a are combined with the four support posts 301 and the pair of fixed guide rails 302, whereby the transfer/holding means 300a is constituted as one three-dimensional moving mechanism. In the other transfer/holding means 300b, the traveling guide rail 303b and the horizontal/vertical moving mechanism 304b are combined with the four support posts 301 and the pair of fixed guide rail 302, whereby the transfer/holding means 300b is constituted as the other three-dimensional moving mechanism. The traveling guide rail 303a and the horizontal/vertical moving mechanism 304a as constituent elements of one transfer/holding means 300a and the traveling guide rail 303b and the horizontal/vertical moving mechanism 304b as constituent elements of the other transfer/holding means 300b are disposed so as to confront each other with the central unloading means 500 therebetween.

One loading means 400a out of the pair of loading means (conveyors) 400a and 400b is installed in X direction on the floor surface F which is contiguous to one corner on one side (left side in FIG. 6) out of two sides parallel to the fixed guide rails 302 of the storage area 100 as a rectangular area in plan, and conveys tires 200 having gone through the preceding process to the storage area 100 in order. A tire loading position 401a provided at a front end portion of the loading means 400a enters the interior of the storage area 100 and, instead of the tire positioned in the first row in Y direction in the first column tire group in X direction, the tire loading position 401a occupies that position so as to permit one tire 200 to be placed thereon. The tire 200 lying in the tire loading position 401a is discriminated for its size by the product discriminating means 402a, then is grasped by a storage product holding mechanism 305a of one transfer/holding means 300a and is stored to a predetermined position within the area A in the storage area 100. In this case, tires 200 are stored in order from the position closer to the tire loading position 401a. When unloading of a tire 200 is directed, one transfer/holding means 300a transfers the tire to the tire unloading position 501 of the unloading means (conveyor) 500.

The other loading means 400b out of the pair of loading means (conveyors) 400a and 400b is disposed in X direction on the floor surface F which is contiguous to the other corner on one side (left side in FIG. 6) out of two sides parallel to the fixed guide rails 302 of the storage area 100 as a rectangular area in plan, and operates in the same way as one loading means 400a. A tire loading position 401b provided at a front end portion of the loading means 400b enters the interior of the storage area 100, and instead of the tire positioned in the final row (seventh row in FIG. 6) in Y direction in the first column tire group in X direction, the tire loading position 401b occupies that position so as to permit one tire 200 to be placed thereon. The tire 200 lying in the tire loading position 401b is discriminated for its size by the product discriminating means 402b, then is grasped by a storage product holding mechanism 305b of the other transfer/holding means 300b and is stored to a predetermined position within the area B in the storage area 100. In this case, tires 200 are stored in order from the position closer to the tire loading position 401b. When unloading of a tire 200 is directed, the other transfer/holding means 300b transfers the tire to the tire unloading position 501 of the unloading means 500.

Figure 11:
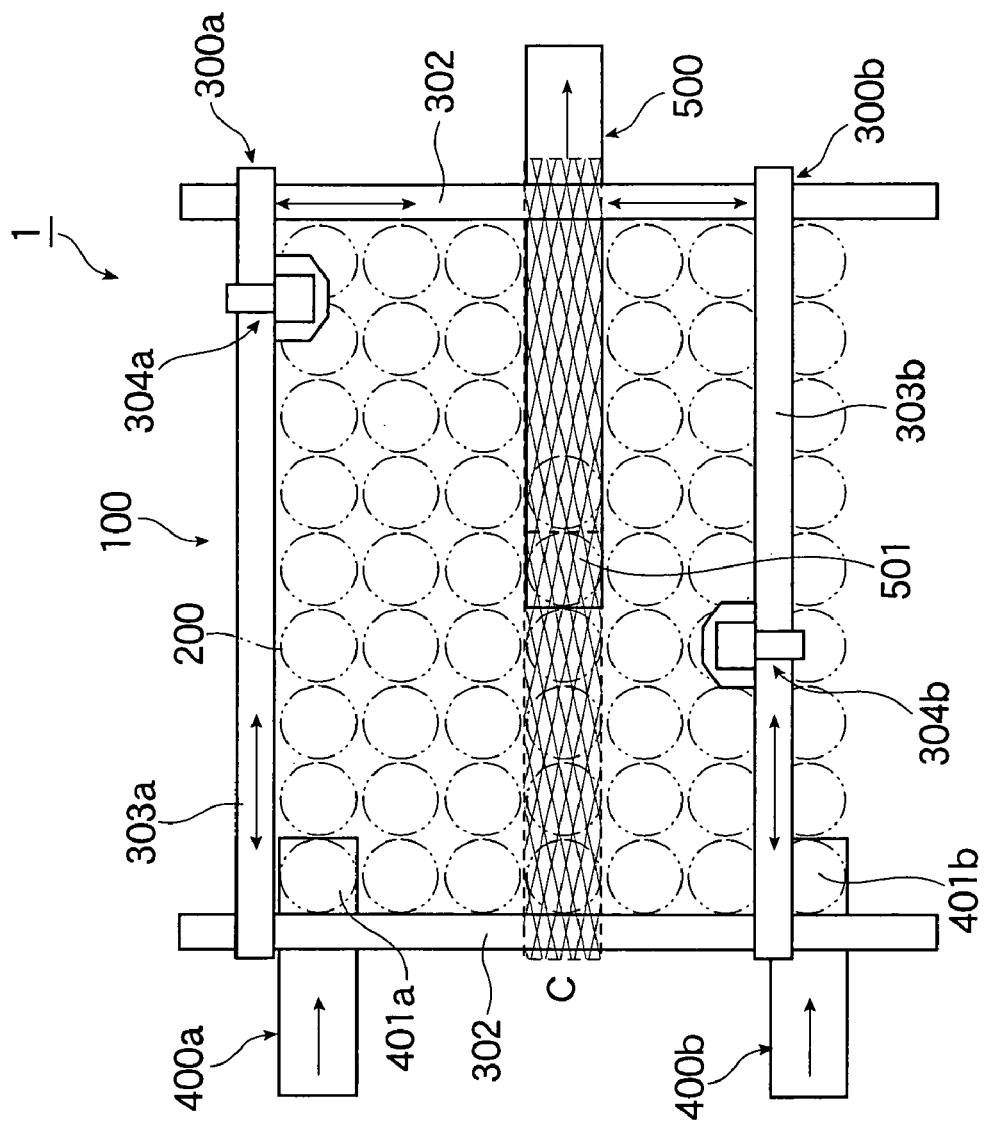
FIG. 11 is a diagram showing an overlapping range of the operation ranges of the pair of transfer/holding means.
Figure 12:
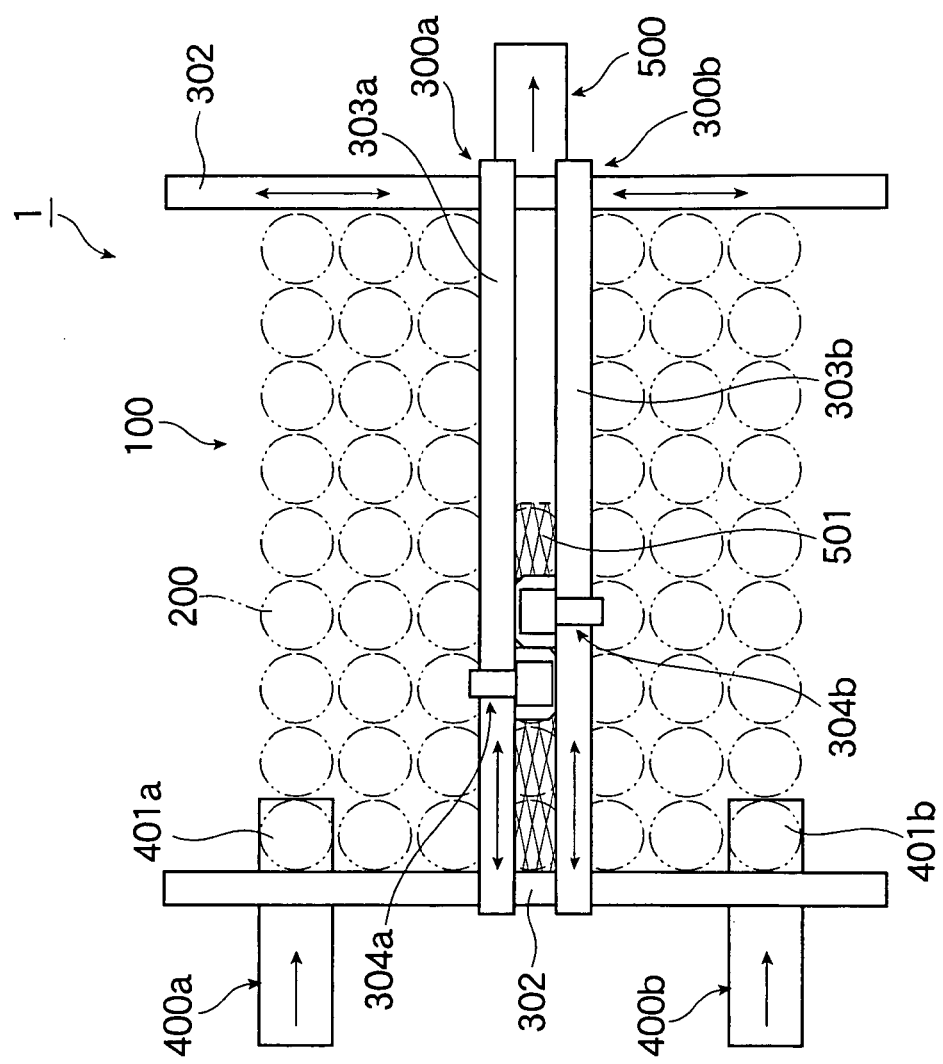
FIG. 12 is a diagram showing in what state the pair of transfer/holding means operate in the overlapping operation range.

As is apparent from the above description, the areas A and B overlap each other in a band-like area (see a crossly hatched area C in FIG. 11) which covers substantially one row of tires 200 in Y direction, including the tire unloading position (product receiving position) 501 of the unloading means 500. As shown in FIG. 12, one transfer/holding means 300a and the other transfer/holding means 300b can make simultaneous access to different tires 200 stored in the overlapping area C. The horizontal/vertical moving mechanisms 304a and 304b move a required quantity between the traveling guide rails 303a and 303b and horizontally along those traveling guide rails, then further move a required quantity vertically, and grasp those tires 200 and transfer them to the tire unloading position 501. One transfer/holding means 300a and the other transfer/holding means 300b can grasp incoming tires 200 and store them in the overlapping area C without mutual interference of both transfer/holding means.

Thus, even if the overlapping area C is present between the operation ranges of the pair of transfer/holding means 300a and 300b, the tires 200 concerned can be taken out from the overlapping range (area C) and stored without mutual interference of both transfer/holding means. Consequently, the efficiency of the storage work for the tires 200 is improved. Besides, since the overlapping area C is relatively narrow, it is possible to diminish the risk of mutual collision of both transfer/holding means 300a and 300b.

When the pair of transfer/holding means 300a and 300b are in a normal condition, the operation range is divided to the range of area A and that of area B and there are performed conveyance and transfer for the tires 200. However, when any one transfer/holding means is suspended due to maintenance or its transfer operation being in off line, the one transfer/holding means moves to its stand-by position, while the other transfer/holding means operates throughout the whole range of the storage area 100 to effect conveyance and transfer of tires 200.

Figure 13:
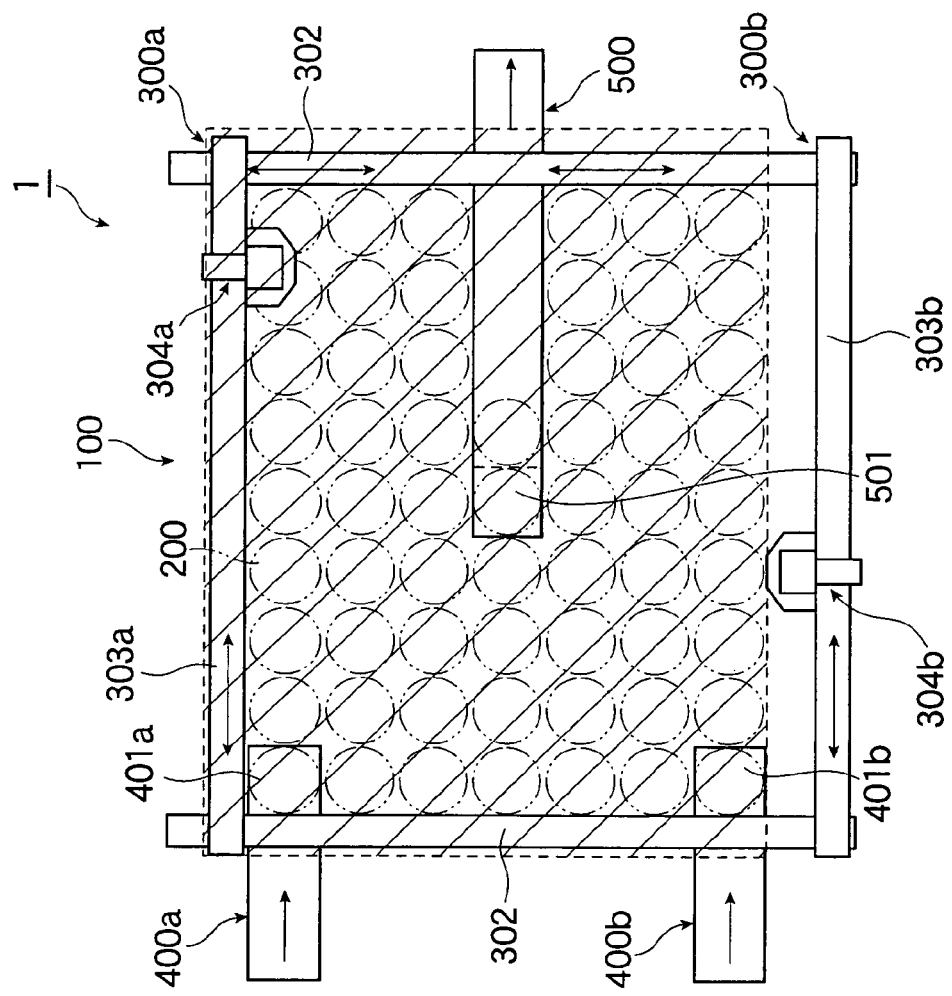
FIG. 13 is a diagram showing an operation range of one transfer/holding means during stand-by of the other transfer/holding means out of the pair of transfer/holding means.
Figure 14:
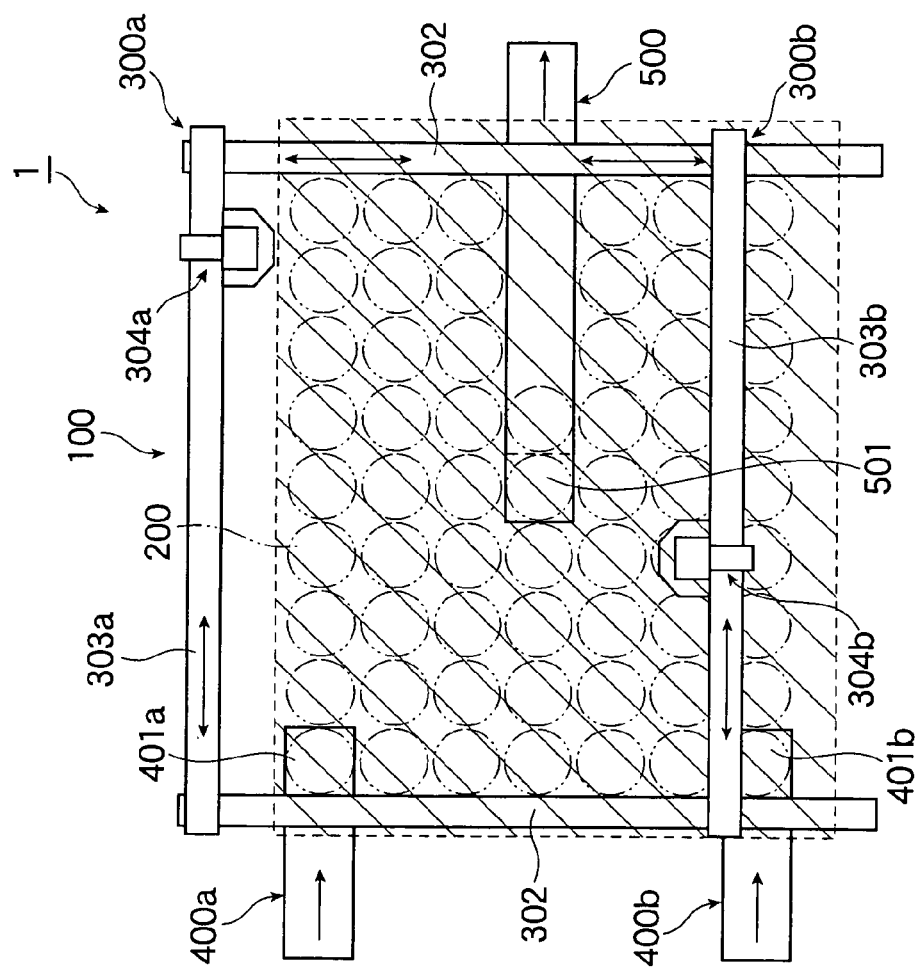
FIG. 14 is a diagram showing an operation range of the other transfer/holding means during stand-by of one transfer means out of the pair of transfer/holding means.

For example, when the transfer/holding means 300b is suspended due to maintenance or its transfer operation being in off line, as shown in FIG. 13, the transfer/holding means 300b moves to its stand-by position located on the opposite end side of the pair of fixed guide rails 302, while the transfer/holding means 300a operates throughout the whole range (hatched area in FIG. 13) of the storage area 100 to effect conveyance and transfer of tires 200. Conversely, when one transfer/holding means 300a is suspended due to maintenance or its transfer operation being in off line, as shown in FIG. 14, the transfer/holding means 300a moves to its stand-by position located on one end side of the pair of fixed guide rails 302, while the other transfer/holding means 300b operates throughout the whole range (hatched area in FIG. 14) of the storage area 100 to effect conveyance and transfer of tires 200.

Thus, when any one transfer/holding means is suspended due to maintenance for example, the other transfer/holding means operates throughout the whole range of the storage area 100 to effect conveyance and transfer of tires 200, so that although the operation efficiency (the storage work efficiency) somewhat lowers, the storage operation can be performed without complete stop of operation of the overhead conveyance/storage system, thus making it possible to diminish the influence on the other processes.

In FIGS. 15 to 21 there are illustrated various modifications of the overhead conveyance/storage system 1 of the second embodiment.

Figure 15:
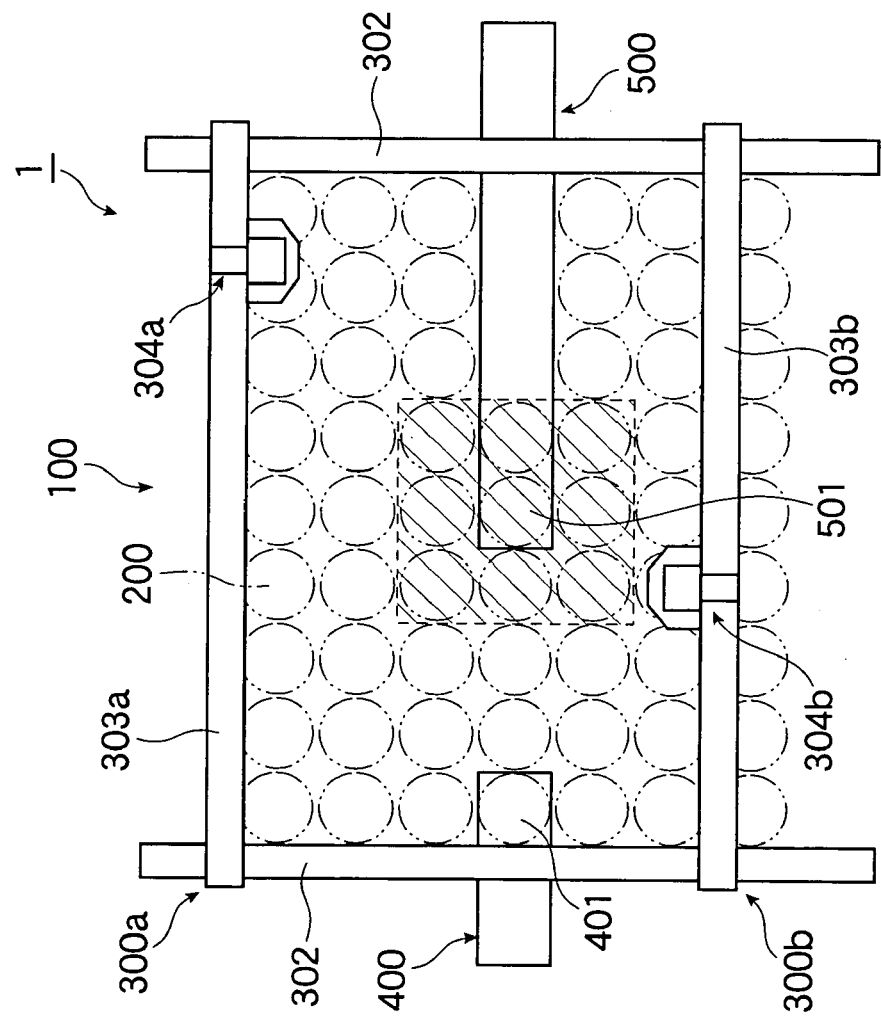
FIG. 15 is a diagram showing a modification of the overhead conveyance/storage system of the second embodiment.

According to the modification shown in FIG. 15, like the first embodiment, only one loading means 400 is disposed at the same position as in the first embodiment instead of the pair of loading means 400a and 400b used in the second embodiment. The tire loading position 401 of the loading means 400 is included in the overlapping area C and the pair of transfer/holding means 300a and 300b can be accessed alternately, thus permitting a rapid loading work for tires 200.

Figure 16:
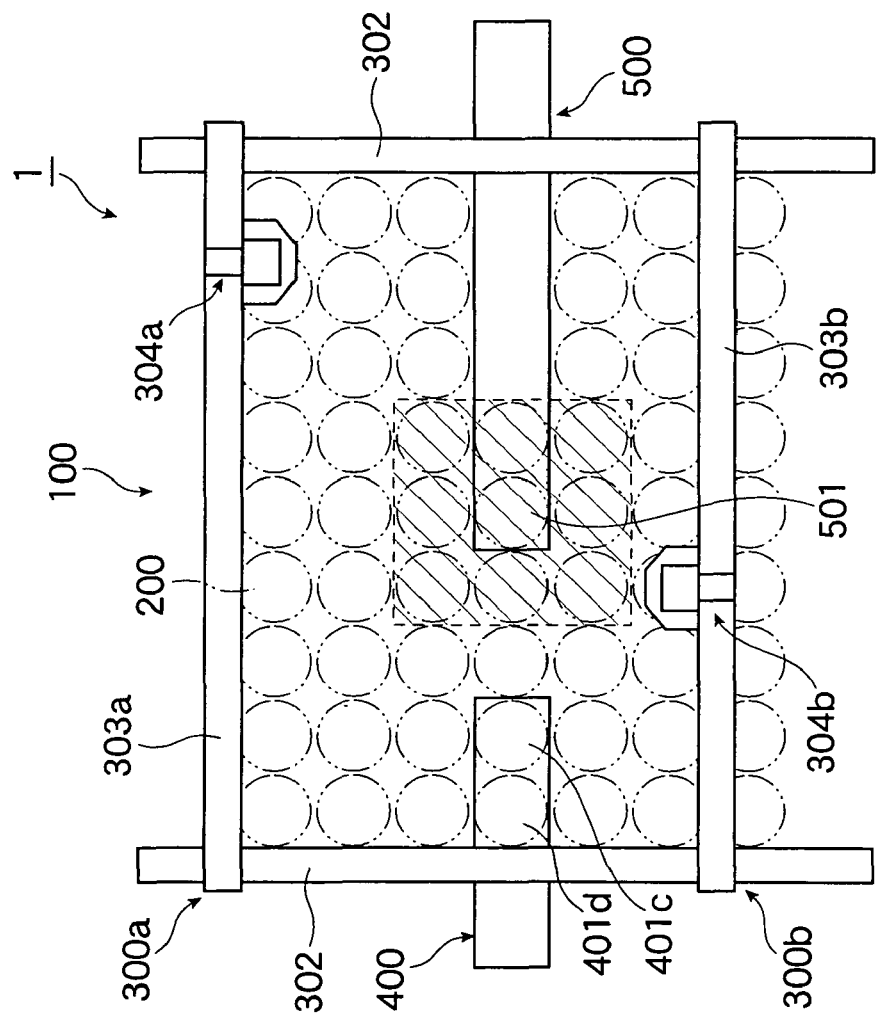
FIG. 16 is a diagram showing another modification of the overhead conveyance/storage system of the second embodiment.

According to the modification shown in FIG. 16, two tire loading positions 401c and 401d are provided side by side instead of the tire loading position 401 of the loading means 400 used in the modification of FIG. 15. The tire loading positions 401c and 401d are also included in the overlapping area C and the pair of transfer/holding means 300a and 300b can be accessed simultaneously, thus permitting a more rapid loading work for tires 200.

In the above second embodiment, the pair of loading means 400a and 400b are installed on the floor surface F contiguous to both corners on one side (left side in FIG. 6) out of two sides parallel to the fixed guide rails 302 of the storage area 100 as a rectangular area in plan. On the other hand, according to the modification shown in FIG. 17, the pair of loading means 400a and 400b are installed on the floor surface F contiguous to central portions on two sides (upper and lower sides in FIG. 17) parallel to the pair of traveling guide rails 303a and 303b of the storage area 100 as a rectangular area in plan. In this modification, conveyance distances at which the pair of transfer/holding means 300a and 300b convey the tires 200 lying in the tire loading positions 401a and 401b respectively of the pair of loading means 400a and 400b up to predetermined positions in the areas A and B correspond to distances of movement within half areas (left half and right half centered at the tire loading positions 401a and 401b in FIG. 17) of the areas A and B. Thus, the distances become extremely short and hence the efficiency of the loading work is improved.

Figure 18:
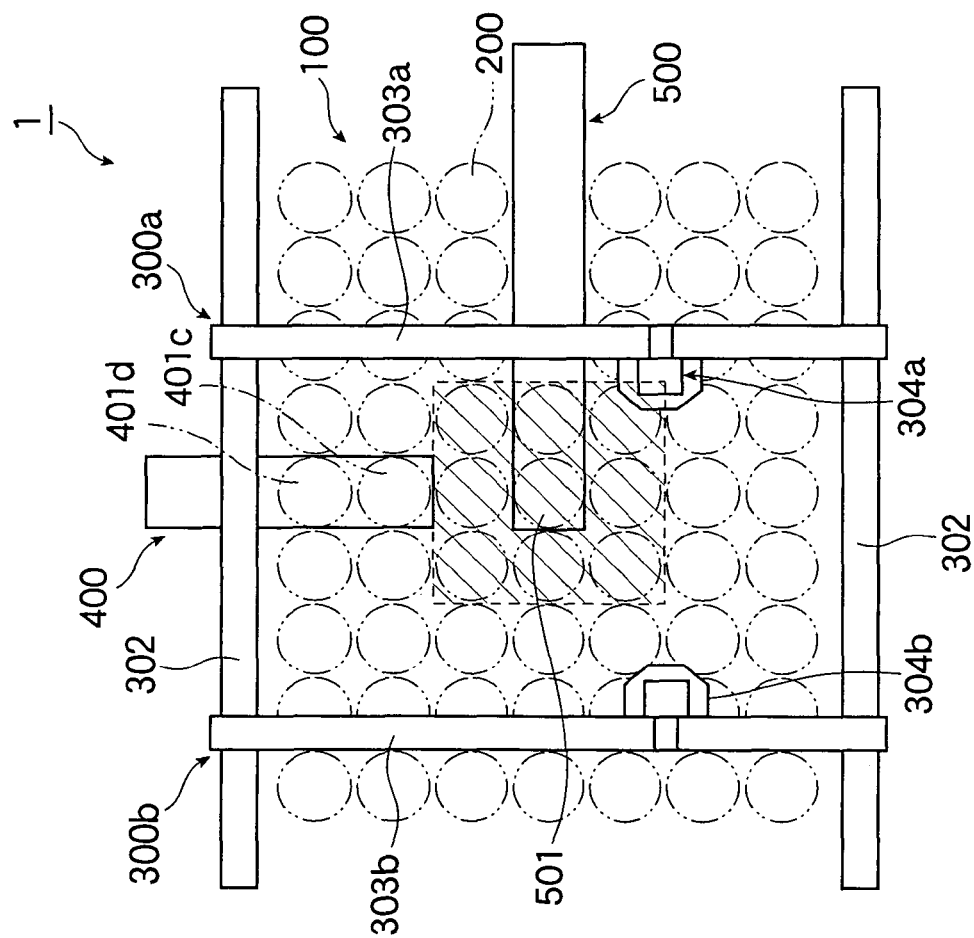
FIG. 18 is a diagram showing a still further modification of the overhead conveyance/storage system of the second embodiment.

The modification shown in FIG. 18 corresponds to the modification shown in FIG. 16 except that the pair of transfer/holding means 300a, 300b and the loading means 400 are disposed at 90° turned positions in plan. Also in this modification it is possible to obtain the same effect as in the modification shown in FIG. 16. The modifications shown in FIGS.

16 to 18 indicate that the loading direction of the tires 200 can be changed to various directions.

Figure 19:
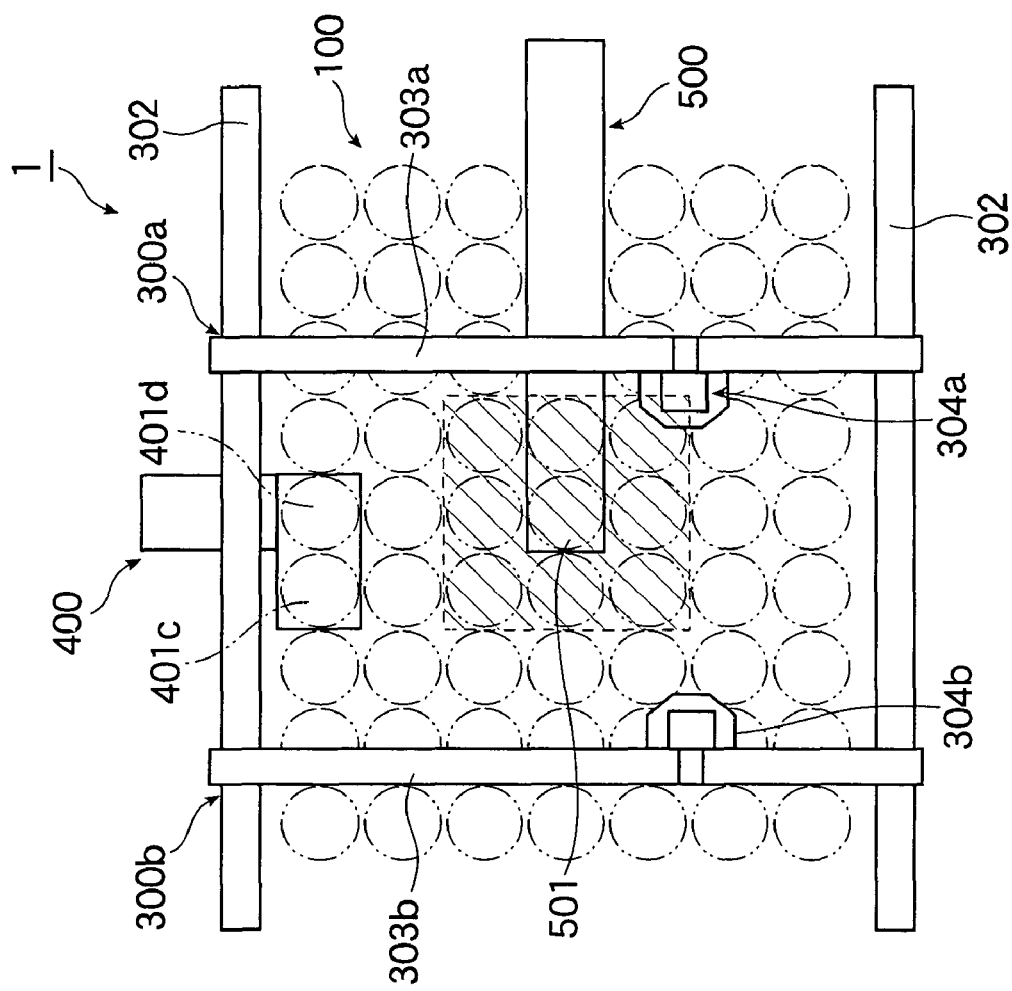
FIG. 19 is a diagram showing a still further modification of the overhead conveyance/storage system of the second embodiment.

The modification shown in FIG. 19 corresponds to the modification shown in FIG. 18 except that the tire loading position 401c of the loading means 400 is changed to a 90° turned position centered at the tire loading position 401d. Also in this modification, it is possible to obtain the same effect as in the modification shown in FIG. 18.

Figure 17:
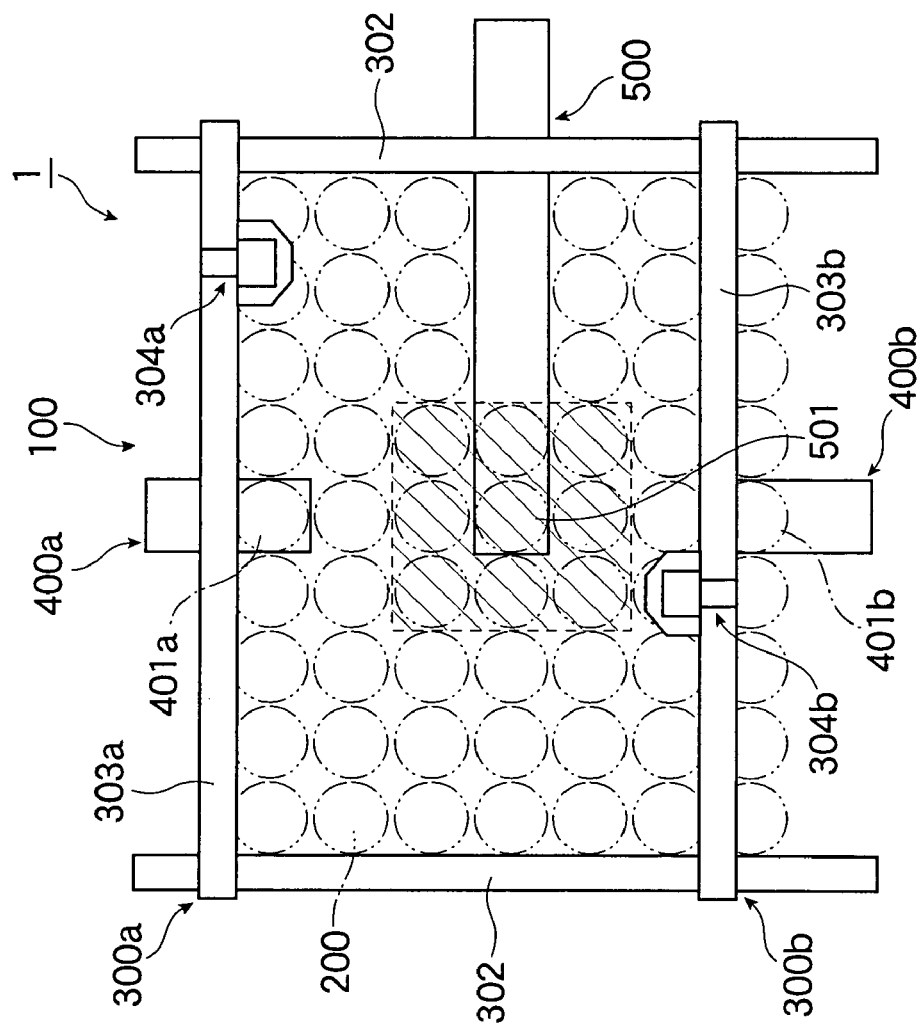
FIG. 17 is a diagram showing a further modification of the overhead conveyance/storage system of the second embodiment.
Figure 20:
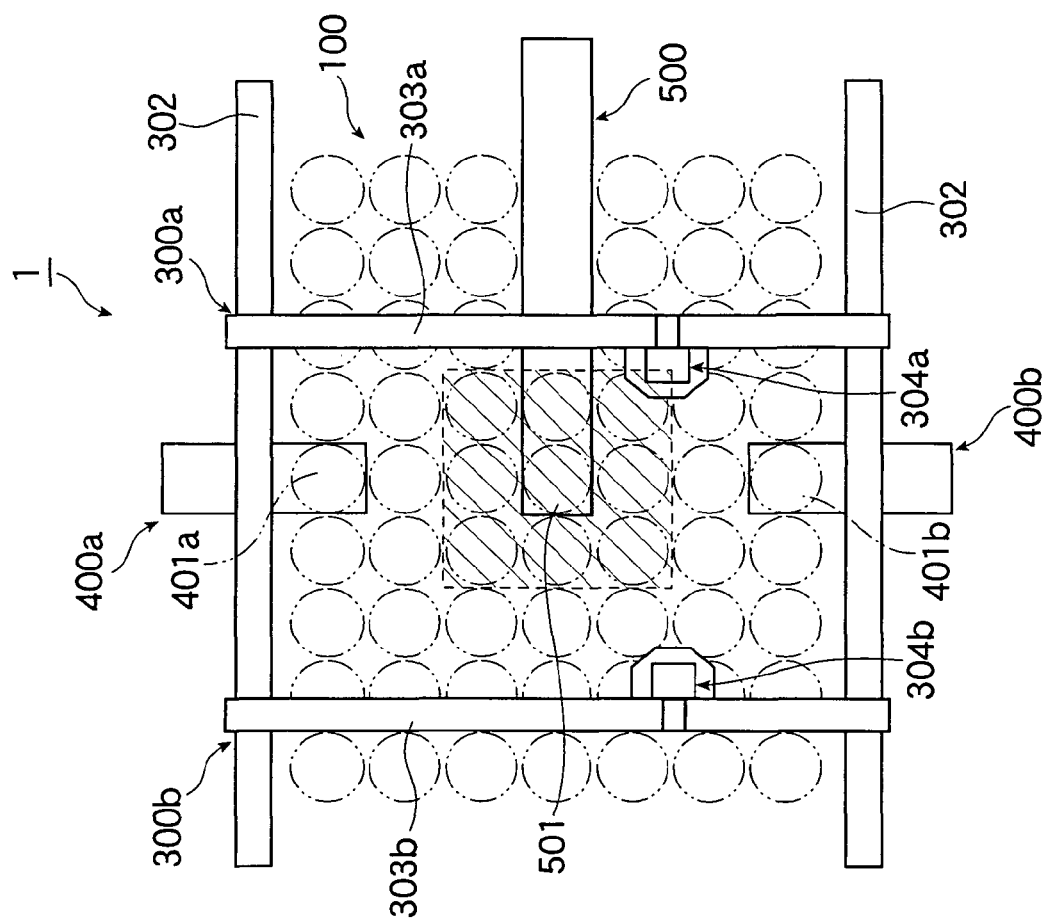
FIG. 20 is a diagram showing a still further modification of the overhead conveyance/storage system of the second embodiment.

The modification shown in FIG. 20 corresponds to the modification should in FIG. 17 except that the pair of transfer/holding means 300a and 300b are disposed at 90° turned positions in plan.

Also in this modification, the distances at which the pair of loading means 400a and 400b convey the tires 200 lying at the tire loading positions 401a and 401b respectively of the pair of loading means 400a and 400b up to the predetermined positions in the areas A and B become short as in the modification shown in FIG. 17, so that the efficiency of the loading work is improved. For example, the tire 200 lying at the tire loading position 401a is conveyed by the transfer/holding means 300a up to a predetermined position in an upper half area in FIG. 20 of the area A, namely, of the right half area in FIG. 20 as an operation range of the transfer/holding means 300a including the tire loading positions 401a and 401b and can be stored therein. Thus, the conveyance distance becomes very short.

Figure 21:
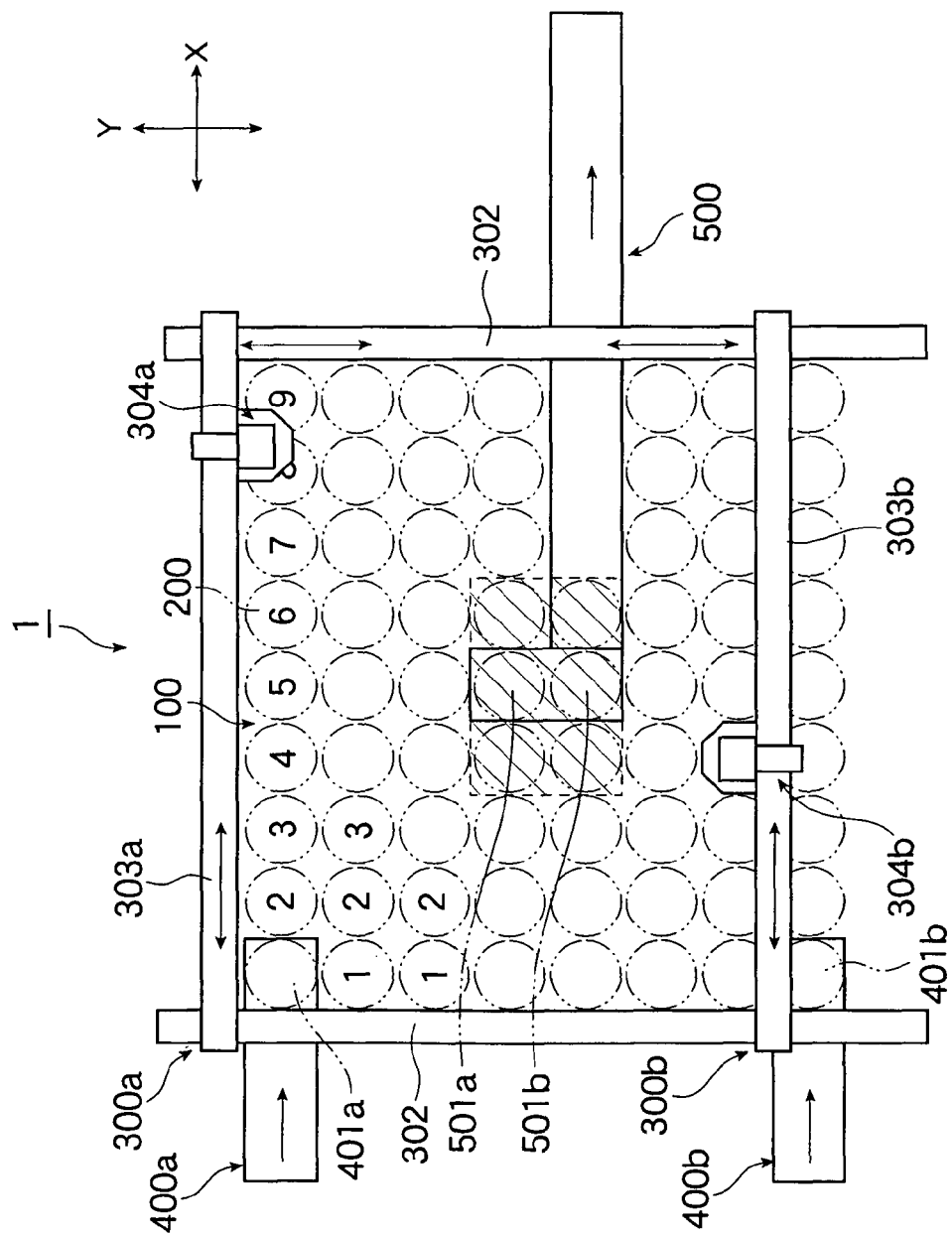
FIG. 21 is a diagram showing a still further modification of the overhead conveyance/storage system of the second embodiment.

The modification shown in FIG. 21 corresponds to the second embodiment except that the tire unloading position (product receiving position) of the unloading means 500 is a central position of the storage area 100 when the number of rows in Y direction of the $n^{th}$ column tire group in X direction stored in the storage area 100 is an even number.

In the overhead conveyance/storage system 1 of the second embodiment illustrated in FIG. 6, the number of rows in Y direction is seven and the best tire unloading position 501 of the unloading means 500 corresponds to the fifth column in X direction and the fourth row in Y direction, assuming the center of the storage area 100. If one row is added in Y direction, resulting in the number of rows in Y direction becoming eight, the tire unloading position 501, if it assumes the same position, comes to be deviated from the central position of the storage area 100. In such a case, another tire unloading position is added adjacent the tire unloading position 501 so that there are two tire unloading positions 501a and 501b centrally of the rows concerned in Y direction. This is the modification shown in FIG. 21.

In this modification, the number of rows in Y direction is eight and the two tire unloading positions 501a and 501b are disposed side by side in the fifth column in X direction and in the fourth and fifth rows in Y direction. Both positions lie centrally of the rows in Y direction and also centrally of the storage area 100. The distance at which one transfer/holding means 300a transfers a tire 200 from the area A (the upper half area in FIG. 21, including the tire unloading position 501a) to the tire unloading position 501a and the distance at which the other transfer/holding means 300b conveys a tire 200 from the area B (the lower half area in FIG. 21, including the tire unloading position 501b) to the tire unloading position 501b become equal to each other. Besides, in both cases, there is no fear of the moving distances being longer in a biased state to either the right or the left side. Accordingly, the efficiency of the tire unloading work is improved.

The tire unloading positions 501a and 501b are not always required to be in the positions described above, but may be in any other positions insofar as they are adjacent row positions on either the right or the left side and within the nearly central hatched area (enclosed with a chain line) of the storage area 100 in FIG. 21.

Since the overhead conveyance/storage system 1 of the second embodiment is constructed as above, it is possible to obtain the following effects.

The overhead conveyance/storage system 1 includes two transfer/holding means 300a and 300b and the operation range of one transfer/holding means is one storage area range (area A) including the tire unloading position (product receiving position) 501 of the unloading means 500, while the operation range of the other transfer/holding means is the other storage area range (area B) including the tire unloading position (product receiving position) 501 of the unloading means 500. Thus, the operation range is divided for each transfer/holding means. Therefore, an overlapping range of different transfer/holding means can be minimized and it is no longer necessary to pay attention to overlapping of operations. Thus, a drive control for the transfer/holding means 300a and 300b become easier.

Moreover, when one transfer/holding means is suspended, the other transfer/holding means can operate throughout the whole range of the storage area 100. Therefore, even when one transfer/holding means is unusable temporarily due to maintenance or any other reason, the other transfer/holding means can perform the storage work over the whole range of the storage area 100, thus making it possible to diminish the influence on the other processes.

Further, the operation range of one transfer/holding means and that of the other transfer/holding means overlap each other and both transfer/holding means can make access simultaneously to different tires 200 stored in the overlapping operation range (area C). Therefore, without mutual interference of the transfer/holding means 300a and 300b, different tires 200 can be taken out from the overlapping range (area C) and stored. Thus, the efficiency of the product storage work is further improved.

Additionally, it is possible to obtain such various effects as described above.

Next, a third embodiment of the present invention will be described below.

Figure 22:
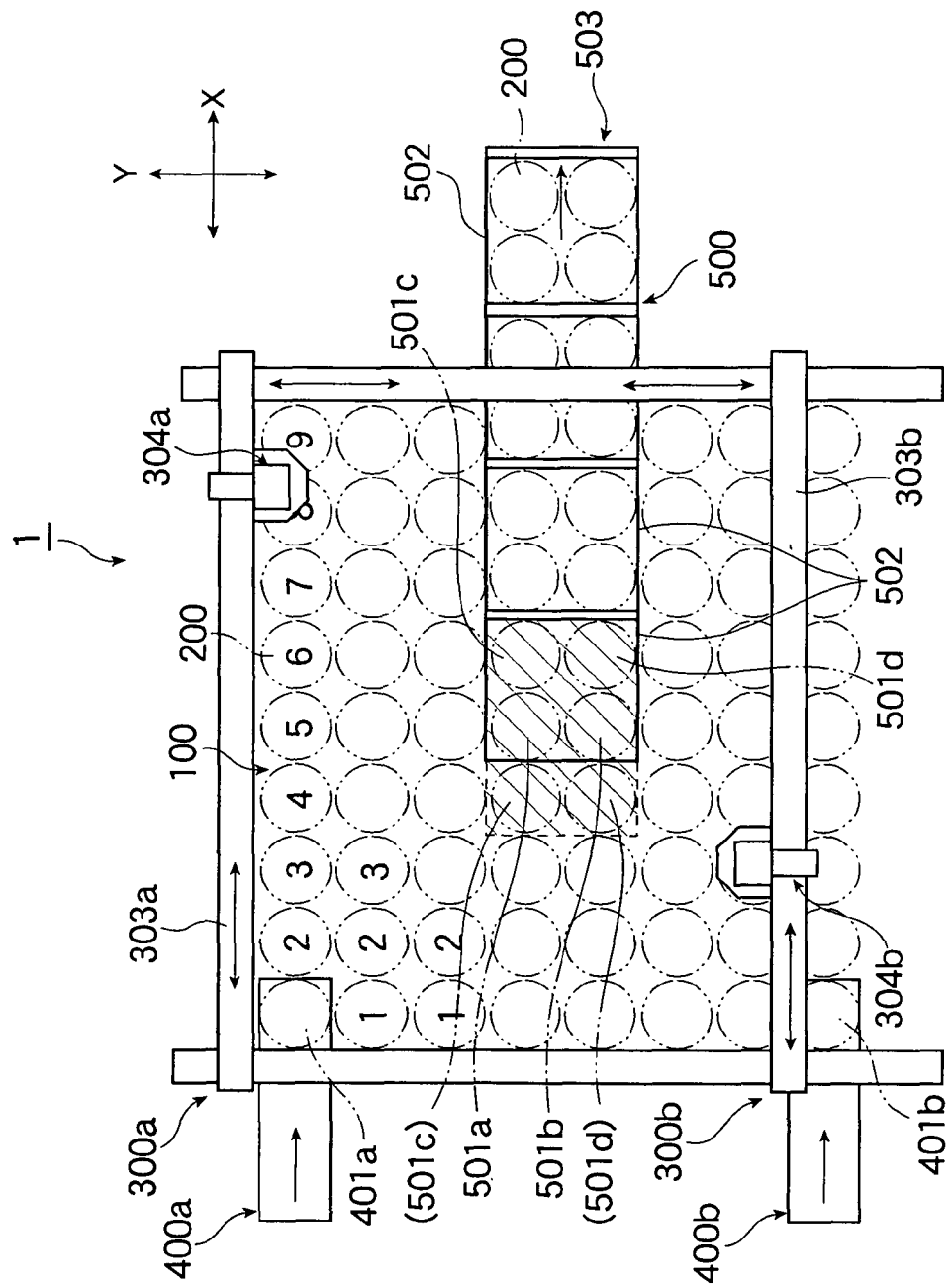
FIG. 22 is a plan view of an overhead conveyance/storage system according to a third embodiment of the present invention.
Figure 23:
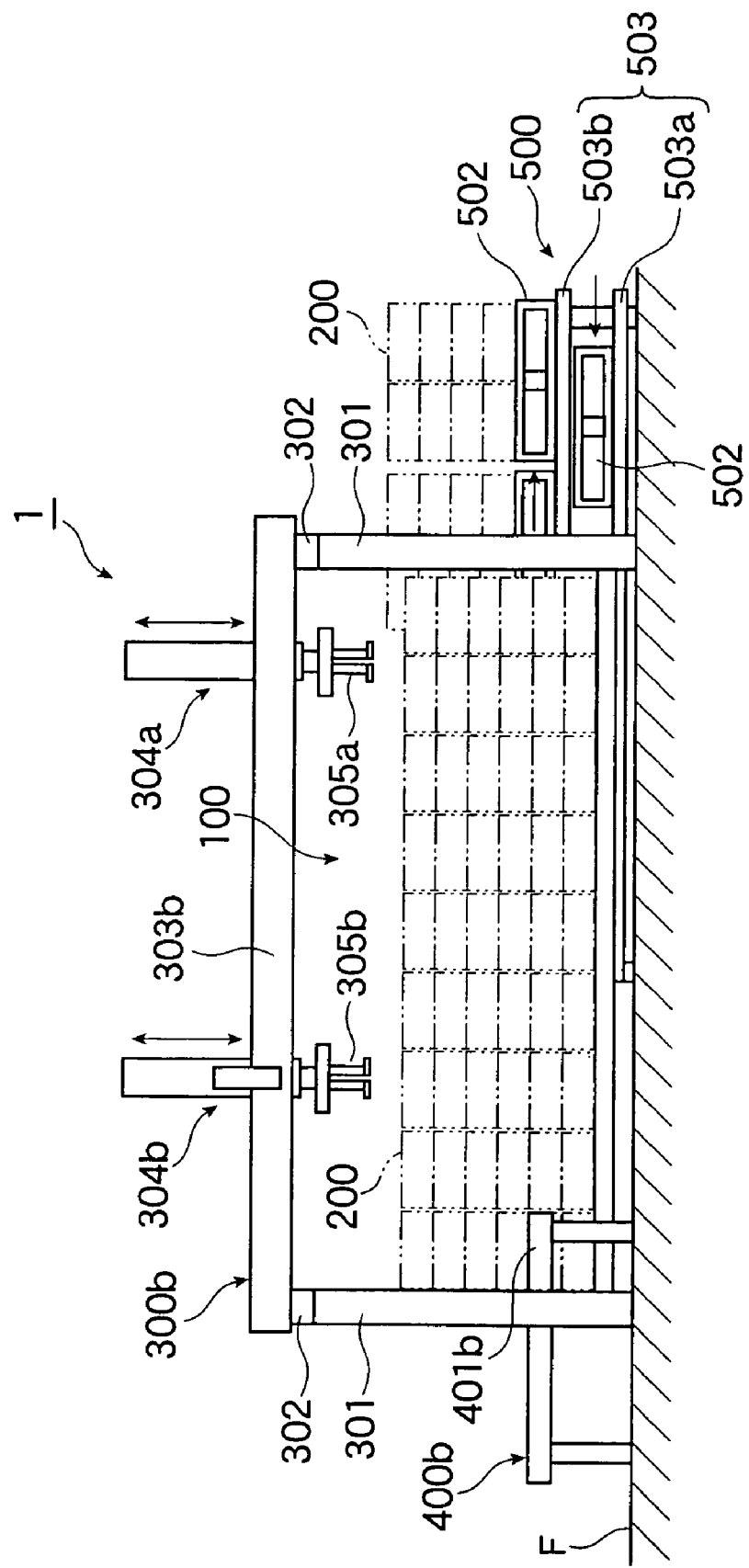
FIG. 23 is a front view thereof

FIG. 22 is a plan view of an overhead conveyance/storage system according to a third embodiment of the present invention and FIG. 23 is a front view thereof. The overhead conveyance/storage system of the third embodiment uses a pallet as the unloading means 500 and is different in this point from the overhead conveyance/storage system 1 of the second embodiment. In the third embodiment the pallet is set to a tire unloading position (product receiving position) to receive plural tires.

As is seen from FIGS. 22 and 23, the overhead conveyance/storage system 1 of the third embodiment corresponds to the modification shown in FIG. 21, which modification is one of the modifications of the overhead conveyance/storage system 1 of the second embodiment, except that a pallet 502 is used as the unloading means 500. More specifically, in the overhead conveyance/storage system 1 of the third embodiment, the pallet 502 is provided in the interior thereof with four tire unloading positions which are the two tire unloading positions 501a and 501b described in the modification shown in FIG. 21, plus two tire unloading positions 501c and 501d adjacent to the tire unloading positions 50 la and 501b on either the right or the left side. The pallet 502 having those four tire unloading positions is set to the product receiving position located nearly centrally of the storage area 100. The conveyor as a constituent element of the unloading means 500 is replaced by a wide conveyor 503 so as to match the size of the pallet 502.

The conveyor 503 is constituted by a pair of a pallet loading conveyor 503*a* and a pallet unloading conveyor 503*b*. An empty pallet 502 is placed on the pallet loading conveyor 503*a* and is carried in up to the product receiving position in the storage area 100, where it is transferred onto the pallet unloading conveyor 503*b* and receives tires 200 of the same kind (same size) on the four tire unloading positions (product receiving positions) 501*a*, 501*b*, 501*c* and 501*d* provided in the interior thereof. Then, the pallet 502 is carried out to the exterior of the storage area 100 by the pallet unloading conveyor 503*b* and is set to the next process. As shown in FIG. 23, tires 200 to be carried out are usually stacked in a predetermined number of stages on the four tire unloading positions (product receiving positions) 501*a*, 501*b*, 501*c* and 501*d*.

Figure 24:
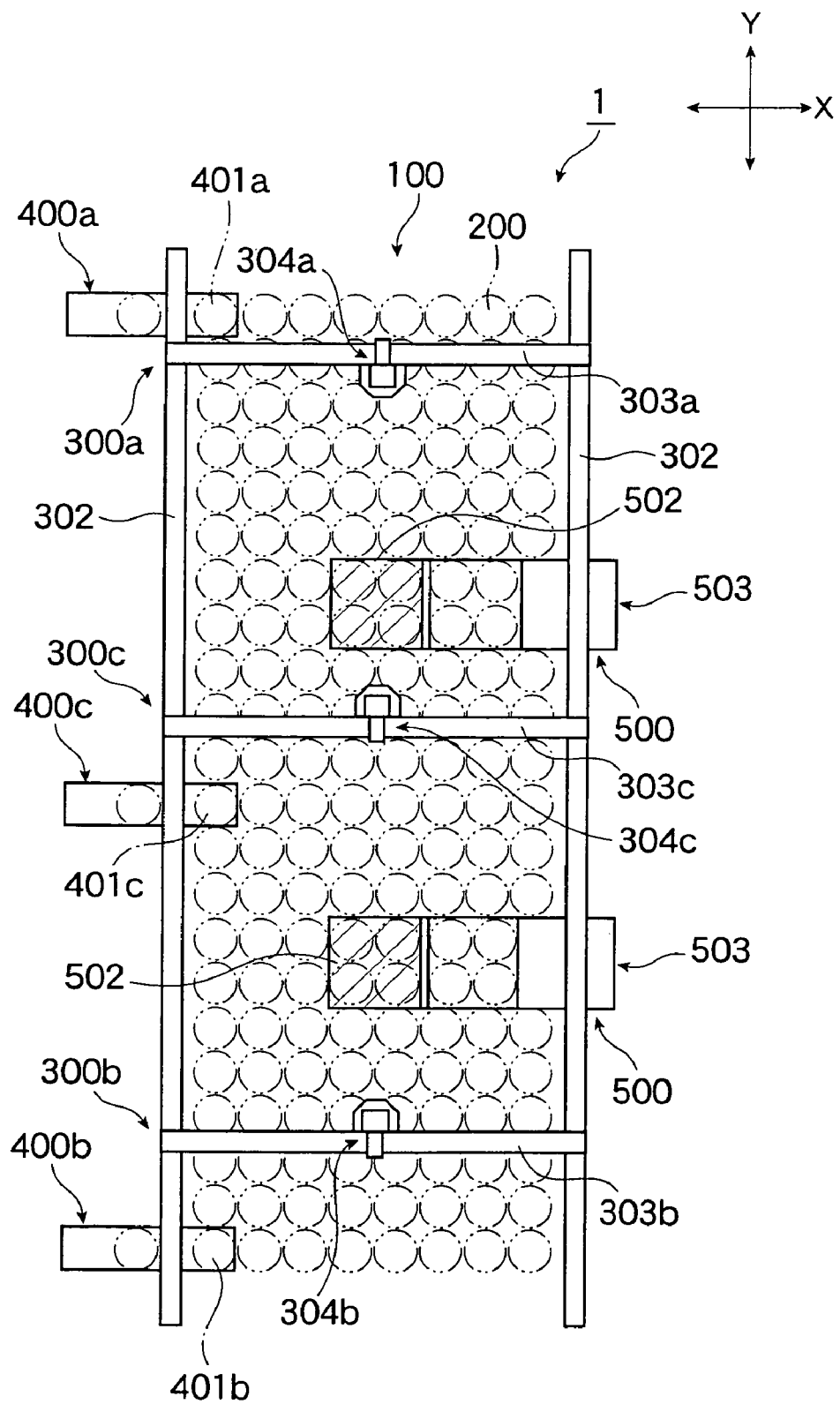
FIG. 24 is a diagram showing a modification of the overhead conveyance/storage system of the third embodiment.

FIG. 24 illustrates a modification of the overhead conveyance/storage system 1 of the third embodiment. Generally, in an overhead conveyance/storage system having a storage area 100 capable of storing products in a number exceeding a predetermined number, there are provided plural transfer/holding means. In this case, the number of product unloading positions is the total number of transfer/holding means minus one and each unloading position is set to a central position best suited for operation of two transfer/holding means which are disposed with the unloading position therebetween.

In the modification illustrated in FIG. 24, the storage area 100 is extended to nearly three times as large as the storage area 100 in the overhead conveyance/storage system 1 of the third embodiment in terms of the length of each row in Y direction of tires 200. Two unloading means 500 described in the overhead conveyance/storage system 1 of the third embodiment are installed within the extended length of the storage area 100 at positions at which the storage area 100 is divided approximately in three. Further, third transfer/holding means 300*c* is installed so that it can operate in the area sandwiched in between the two unloading means 500. Likewise, third loading means 400*c* is installed correspondingly to the third transfer/holding means 300*c*.

The third transfer/holding means 300*c* holds a tire 200 lying in the tire loading position 401*c* of the third loading means 400*c*, then conveys the tire to the area sandwiched in between the rows in Y direction where the two unloading means 500 are installed, and stores it therein. Then, in accordance with directions, the third transfer/holding means 300*c* carries out the tire 200 from the stored place and can transfer it onto the pallet 502 of one of the two unloading means 500.

Since the overhead conveyance/storage system 1 of the third embodiment is constructed as above, it is possible to obtain the following effects.

Since the unloading means 500 is provided with the pallet 502 (resting means) capable of placing plural tires 200 thereon, the work of selecting and gathering plural tires 200 of a predetermined kind (size) from among plural tires 200 stored in the storage area 100 can be done simultaneously with the unloading work. Therefore, it is possible to attain both reduction of the equipment cost and effective utilization of the equipment installing space.

Next, a description will be given below about a fourth embodiment of the present invention.

Figure 25:
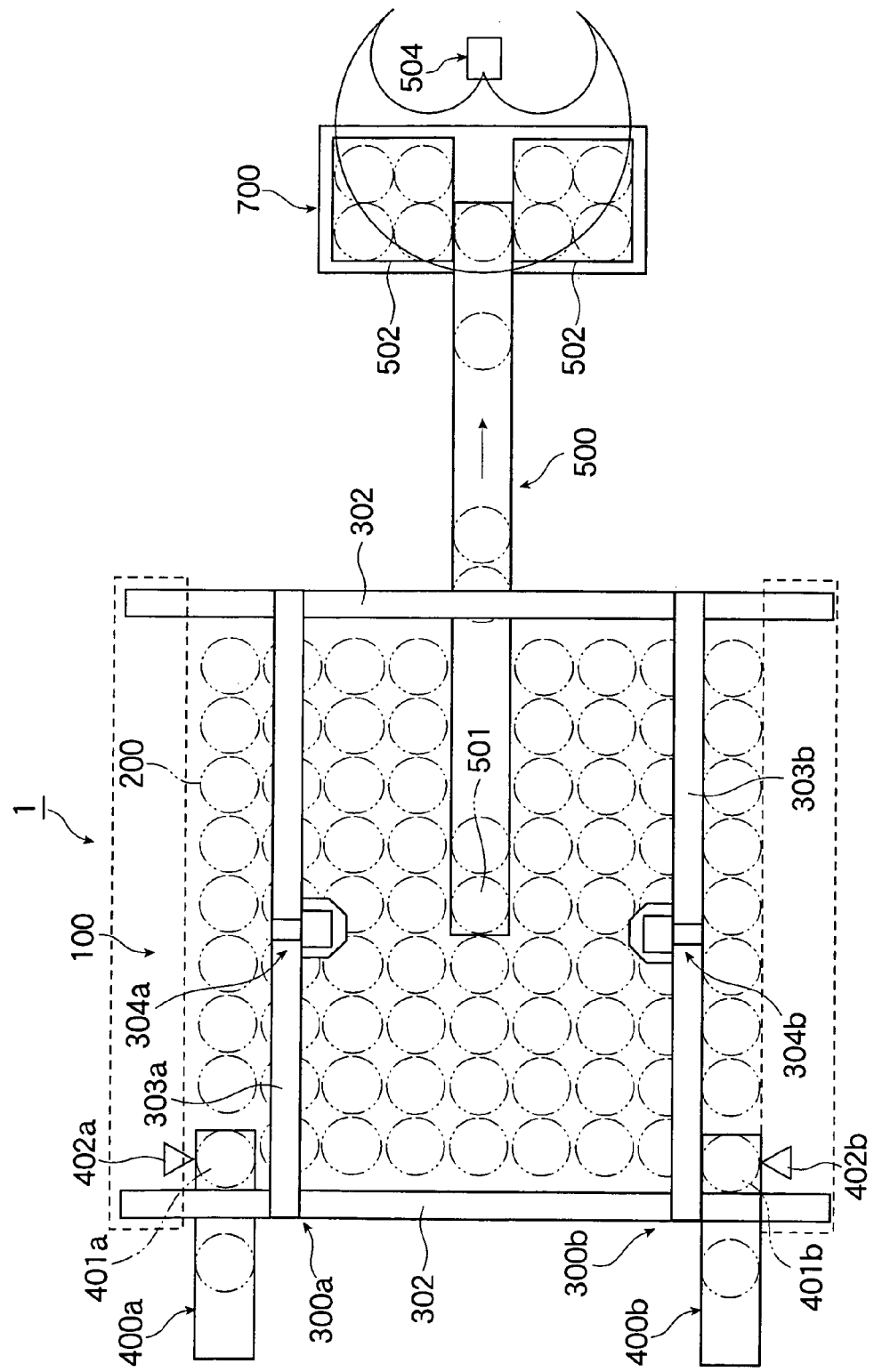
FIG. 25 is a plan view of an overhead conveyance/storage system according to a fourth embodiment of the present invention.

FIG. 25 is a plan view of an overhead conveyance/storage system of the fourth embodiment.

As compared with the overhead conveyance/storage system 1 of the third embodiment, the overhead conveyance/storage system of the fourth embodiment is common thereto in point of using pallets 502 as the unloading means 500, but is different in that the pallets 502 are set to a terminal end portion of the unloading means 500 which end portion lies in the exterior of the storage area 100. The terminal end portion of the unloading means 500 is a starting point at which plural tires 200 placed on the pallet 502 are transferred to the next process.

As is seen from FIG. 25, the overhead conveyance/storage system 1 of the fourth embodiment corresponds to the overhead conveyance/storage system 1 of the second embodiment illustrated in FIG. 6 except that the pallets 502 are set to the terminal end portion of the unloading means 500. The pallets 502 are set respectively to both sides of the terminal end portion of the conveyor as a constituent element of the unloading means 500 and an area which surrounds the pallets 502 is defined as a palletizing area 700. Tires 200 having been conveyed by the conveyor are classified into predetermined kinds (sizes) by transfer means 504 which is provided separately, and then are each transferred onto either of the pallets 502. Then, the tires 200 are conveyed to the next process together with the pallet.

In FIG. 25, the areas enclosed by three large and small circles at the right end portion represent operation areas of the transfer means 504, while the elongated upper and lower rectangular areas enclosed by chain lines in the storage area 100 represent stand-by areas of the pair of transfer/holding means 300*a* and 300*b*.

Figure 26:
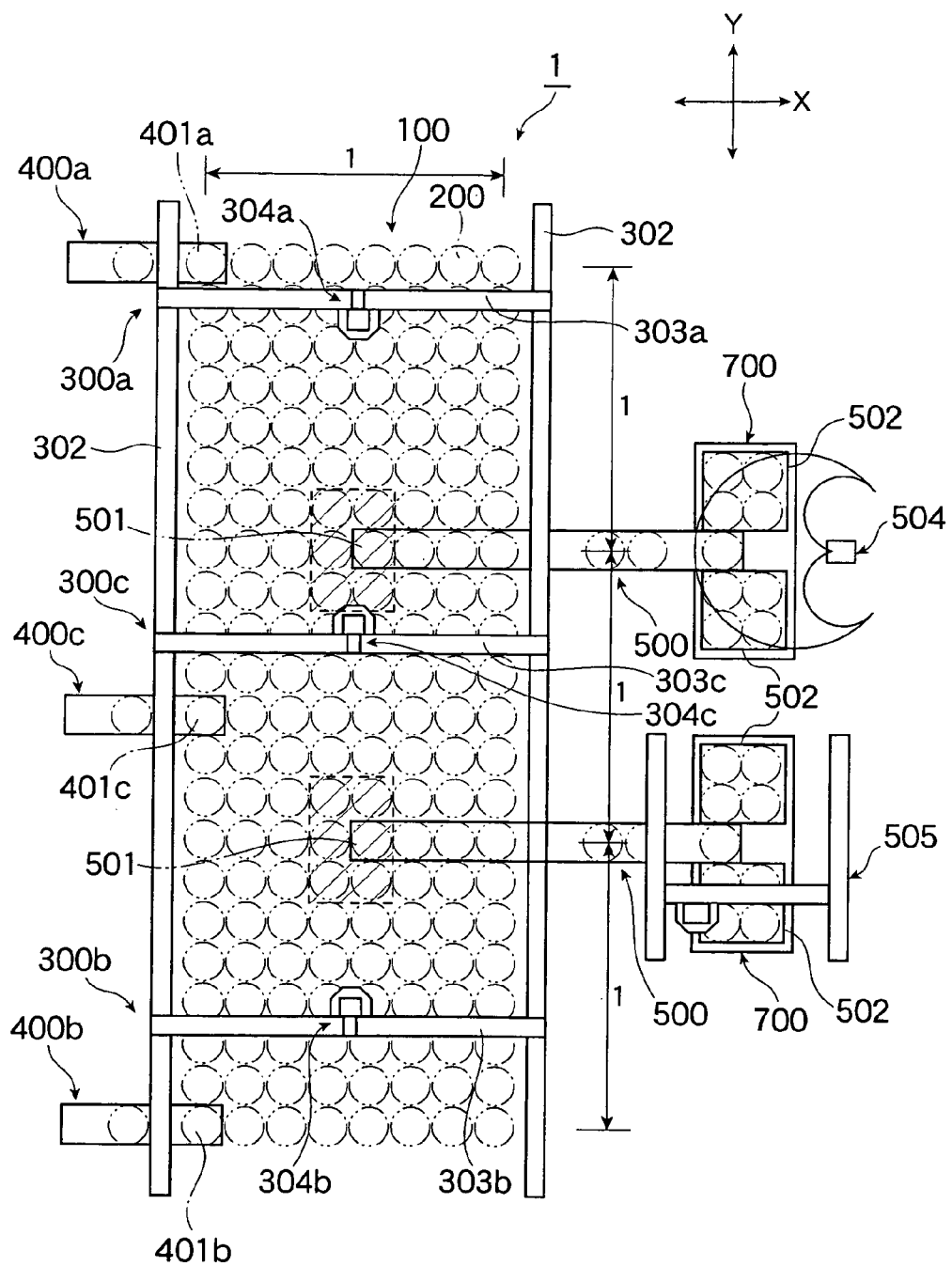
FIG. 26 is a diagram showing a modification of the overhead conveyance/storage system of the fourth embodiment.

In FIG. 26 there is illustrated a modification of the overhead conveyance/storage system 1 of the fourth embodiment. In this modification, the storage area 100 is extended, in the length of rows in Y direction of tires 200, to nearly three times as large as the storage area 100 in the overhead conveyance/storage system 1 of the fourth embodiment and two unloading means 500 described in the overhead conveyance/storage system 1 of the fourth embodiment are installed within the range of the extended length at positions at which the storage area 100 is divided approximately in three. Moreover, third transfer/holding means 300*c* is installed so that it can operate in the area sandwiched in between the two unloading means 500. Further, third loading means 400*c* is installed correspondingly to the third transfer/holding means 300*c*.

In this modification, each of the trisected areas in the storage area 100 is in an approximately square shape in plan. Each hatched area enclosed with a chain line and including the tire unloading position (product receiving position) 501 and including two columns in X direction and three rows in Y direction of tires 200 indicates an area in which the tire unloading position 501 may be set therein.

The third transfer/holding means 300*c* holds the tire 200 lying in the tire loading position 401*c* of the third loading means 400*c*, then conveys the tire to the area sandwiched in between the rows in Y direction in which the two unloading means 500 are installed, and stores it therein. Further, in accordance with directions the third transfer/holding means 300*c* carries out the tire 200 from the stored place and can transfer it to the tire unloading position 501 of one of the two unloading means 500. The tire 200 thus transferred to the tire unloading position 501 is conveyed toward the palletizing area 700 by the conveyor of the unloading means 500, then is classified into a predetermined kind (size) by the transfer means 504 and 505 and is transferred onto either of the pallets 502. The tires 200 thus gathered on the pallet are conveyed to the next process together with the pallet.

The transfer means 504 and 505 are of different types. Both may be conventional ones, provided the transfer means 505 is the same in mechanism as the transfer/holding means 300, 300*a*, 300*b* and 300*c* described in the first to fourth embodiments.

Since the overhead conveyance/storage system 1 of the fourth embodiment is constructed as above, it is possible to obtain the same effects as those obtained in the overhead conveyance/storage system 1 of the third embodiment. In addition, since the pallets 502 are set to the terminal end portions of the unloading means 500 located outside the storage area 100, it is possible to flexibly cope with the case where the pallets 502 are needed and the case where the pallets 502 are not needed, according to the kind of storage products.

The overhead conveyance/storage method according to the present invention is performed by execution of the second to fourth embodiments described above. The contents thereof are apparent to those skilled in the art and the effects thereof are also the same as obtained in those embodiments, so detailed explanations thereof will here be omitted.

The present invention is not limited to the above embodiments, but various changes may be made within the scope not departing from the gist of the invention.

For example, in the case where the products to be stored in the storage area 100 are not only tires 200 but also various other products (various types and sizes), the product discriminating means 402 reads the type and size of incoming products, then in accordance with the result of the discrimination the transfer/holding means 300 conveys and stores the product to the position (divided area) where products of the same type and size as those of the incoming product are stored in the storage area 100.

What is claimed is:

1. An overhead conveyance/storage system comprising at least:
   a product storage area having x and y dimensions;
   at least one transfer/holding means adapted to move through a ceiling space in said storage area in three-dimensional directions comprising vertical, transverse and longitudinal directions while holding a product; and
   unloading means for carrying a product out of said storage area, said unloading means having an elongated structure extending from an end exterior to said product storage area to a distal end approximately centrally located, in both x and y dimensions, within said product storage area in plan view, an area adjacent said distal end serving as a product receiving position of said unloading means for receiving the product.

2. The overhead conveyance/storage system according to claim 1, further comprising loading means for carrying a product into said storage area, said loading means having an elongated structure extending from an end exterior to said product storage area to a distal end within said product storage area in plan view, an area adjacent said distal end of said loading means serving as a product loading position; and
   wherein said transfer/holding means transfers a product at the product loading position to said storage area.

3. The overhead conveyance/storage system according to claim 2, wherein the number of product carried at a time into said storage area by the loading means is at least one.

4. The overhead conveyance/storage system according to claim 3, further comprising at least one product discriminating means for acquiring information on an incoming product and discriminating the product on the basis of the acquired information, said product discriminating means being disposed in said loading means.

5. The overhead conveyance/storage system according to claim 1, wherein said unloading means is a conveyor.

6. The overhead conveyance/storage system according to claim 1, wherein said unloading means includes product placing means capable of placing at least one product thereon.

7. The overhead conveyance/storage system according to claim 1, further comprising at least two said transfer/holding means, an operation range of one said transfer/holding means being one storage area range including said product receiving position of said unloading means and an operation range of the other transfer/holding means being the other storage area range including said product receiving position of said unloading means.

8. The overhead conveyance/storage system according to claim 7, wherein when one said transfer/holding means is suspended, the other transfer/holding means can operate over all the storage area ranges.

9. The overhead conveyance/storage system according to claim 7, wherein the operation ranges of said at least two transfer/holding means overlap each other to form an overlapping operating range, and said at least two transfer/holding means can simultaneously access different products stored in the overlapping operation range.

10. The overhead conveyance/storage system according to claim 9, further comprising control means, said control means storing a plurality of address spaces corresponding to a plurality of actual storage spaces set by dividing said storage area for each type and size of plural products of various types and sizes, updating said address spaces in accordance with the result of discrimination made by said product discriminating means and the result of unloading performed by said unloading means after transferring by said transfer/holding means one or plural stacked products of the same type and same size to said product receiving position of said unloading means, thereby managing said actual storage spaces, and performing a predetermined drive control for said transfer/holding means and said unloading means.

11. The overhead conveyance/storage system according to claim 1, wherein said product storage area is a planar area of x and y dimensions traversed by said transfer/holding means.

12. The overhead conveyance/storage system according to claim 1, wherein said distal end of said unloading means is located in a planar area corresponding to a planar floor area occupied by a storage position centered in both of the x and y dimensions and surrounding, next adjacent storage positions.

13. The overhead conveyance/storage system according to claim 1,
   wherein said storage area includes divided areas divided longitudinally and transversely; and
   said product receiving position provided at said distal end is disposed in such a manner as to be located over any of said divided areas.

14. The overhead conveyance/storage system according to claim 1,
   wherein said storage area includes divided areas divided longitudinally and transversely; and
   a plurality of said product receiving positions provided adjacent said distal end are disposed in such a manner as to be located over any of said divided areas.

* * * * *